(12) United States Patent
Sun et al.

(10) Patent No.: US 11,258,064 B2
(45) Date of Patent: Feb. 22, 2022

(54) CATHODE ACTIVE MATERIAL, METHOD FOR MANUFACTURING SAME, AND LITHIUM SECONDARY BATTERY COMPRISING SAME

(71) Applicant: IUCF-HYU (INDUSTRY-UNIVERSITY COOPERATION FOUNDATION HANYANG UNIVERSITY), Seoul (KR)

(72) Inventors: Yang-Kook Sun, Seoul (KR); Un Hyuck Kim, Gunpo-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 16/939,971

(22) Filed: Jul. 27, 2020

(65) Prior Publication Data

US 2020/0358097 A1    Nov. 12, 2020

Related U.S. Application Data

(63) Continuation of application No. 16/171,665, filed on Oct. 26, 2018, now Pat. No. 10,763,505, which is a
(Continued)

(30) Foreign Application Priority Data

Apr. 29, 2016  (KR) .................. 10-2016-0052597

(51) Int. Cl.
*H01M 4/525*     (2010.01)
*C04B 41/85*     (2006.01)
(Continued)

(52) U.S. Cl.
CPC ............ *H01M 4/525* (2013.01); *C01G 53/04* (2013.01); *C01G 53/42* (2013.01); *C04B 41/85* (2013.01);
(Continued)

(58) Field of Classification Search
CPC ....................... C01P 2004/80; C01P 2006/40
See application file for complete search history.

(56) References Cited

U.S. PATENT DOCUMENTS

2012/0270104 A1   10/2012 Paulsen et al.
2013/0323596 A1   12/2013 Morita et al.
(Continued)

FOREIGN PATENT DOCUMENTS

EP      2 897 201 A1     7/2015
JP      2011-519126 A    6/2011
(Continued)

OTHER PUBLICATIONS

Zhang et al. "Effects of Fluorine Doping on Nickel-Rich Positive Electrode Materials for Lithium-Ion Batteries", 2020, Journal of the Electrochemical Society, 167, 080518; PDF pp. 1-11. Note that this document does not qualify as prior art for the present application, but is cited as relevant. (Year: 2020).*
(Continued)

*Primary Examiner* — Katie L. Hammer
(74) *Attorney, Agent, or Firm* — Sughrue Mion, PLLC

(57) ABSTRACT

A method for manufacturing a positive active material is provided. The method includes forming a positive active material precursor including nickel, mixing and firing the positive active material precursor and lithium salt to form a preliminary positive active material particle, forming a coating material including fluorine on the preliminary positive active material particle by dry-mixing the preliminary positive active material particle with a coating source including
(Continued)

fluorine, and manufacturing a positive active material particle by thermally treating the preliminary positive active material particle on which the coating material is formed.

5 Claims, 26 Drawing Sheets

Related U.S. Application Data continuation of application No. PCT/KR2017/004634, filed on May 2, 2017.

(51) Int. Cl.
| | | |
|---|---|---|
| H01M 4/505 | (2010.01) | |
| C01G 53/04 | (2006.01) | |
| C09D 1/00 | (2006.01) | |
| H01M 4/36 | (2006.01) | |
| H01M 4/131 | (2010.01) | |
| H01M 4/1391 | (2010.01) | |
| H01M 4/485 | (2010.01) | |
| C01G 53/00 | (2006.01) | |
| H01M 4/58 | (2010.01) | |
| H01M 10/0525 | (2010.01) | |
| H01M 4/02 | (2006.01) | |

(52) U.S. Cl.
CPC .............. *C09D 1/00* (2013.01); *H01M 4/131* (2013.01); *H01M 4/1391* (2013.01); *H01M 4/36* (2013.01); *H01M 4/366* (2013.01); *H01M 4/485* (2013.01); *H01M 4/505* (2013.01); *H01M 4/582* (2013.01); *C01P 2002/54* (2013.01); *C01P 2002/72* (2013.01); *C01P 2002/85* (2013.01); *C01P 2004/03* (2013.01); *C01P 2004/04* (2013.01); *C01P 2004/80* (2013.01); *C01P 2006/40* (2013.01); *C04B 2235/3203* (2013.01); *C04B 2235/3279* (2013.01); *C04B 2235/75* (2013.01); *H01M 10/0525* (2013.01); *H01M 2004/028* (2013.01); *Y02E 60/10* (2013.01)

(56) References Cited

U.S. PATENT DOCUMENTS

| | | | |
|---|---|---|---|
| 2015/0118563 A1 | 4/2015 | Chen | |
| 2015/0147655 A1* | 5/2015 | Park | H01M 4/582 |
| | | | 429/231.1 |
| 2015/0243971 A1 | 8/2015 | Cho et al. | |
| 2016/0028080 A1* | 1/2016 | Sugiura | H01M 4/582 |
| | | | 429/223 |
| 2016/0049645 A1 | 2/2016 | Zheng et al. | |
| 2016/0181593 A1 | 6/2016 | Jin et al. | |
| 2016/0276659 A1* | 9/2016 | Choi | H01M 4/525 |

FOREIGN PATENT DOCUMENTS

| | | |
|---|---|---|
| KR | 10-2006-0109305 A | 10/2006 |
| KR | 10-2013-0033154 A | 4/2013 |
| KR | 10-2013-0078413 A | 7/2013 |
| KR | 10-2014-0073953 A | 6/2014 |
| KR | 10-2014-0142171 A | 12/2014 |
| KR | 10-2015-0022225 A | 3/2015 |
| KR | 10-2015-0100406 A | 9/2015 |
| WO | 2015/026080 A1 | 2/2015 |

OTHER PUBLICATIONS

International Search Report for PCT/KR2017/004634 dated Jul. 31, 2017.

* cited by examiner

[Fig. 1]
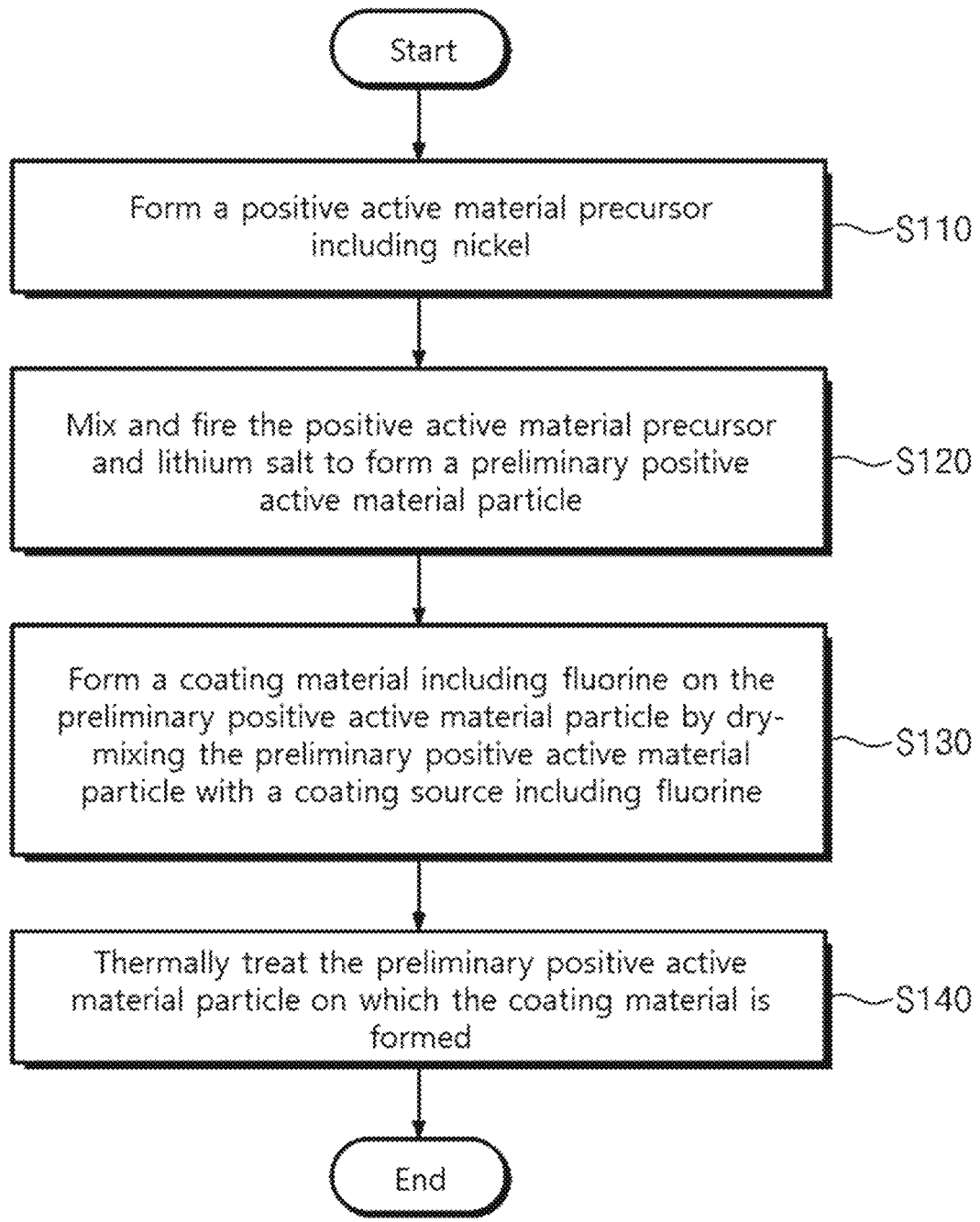

[Fig. 2]
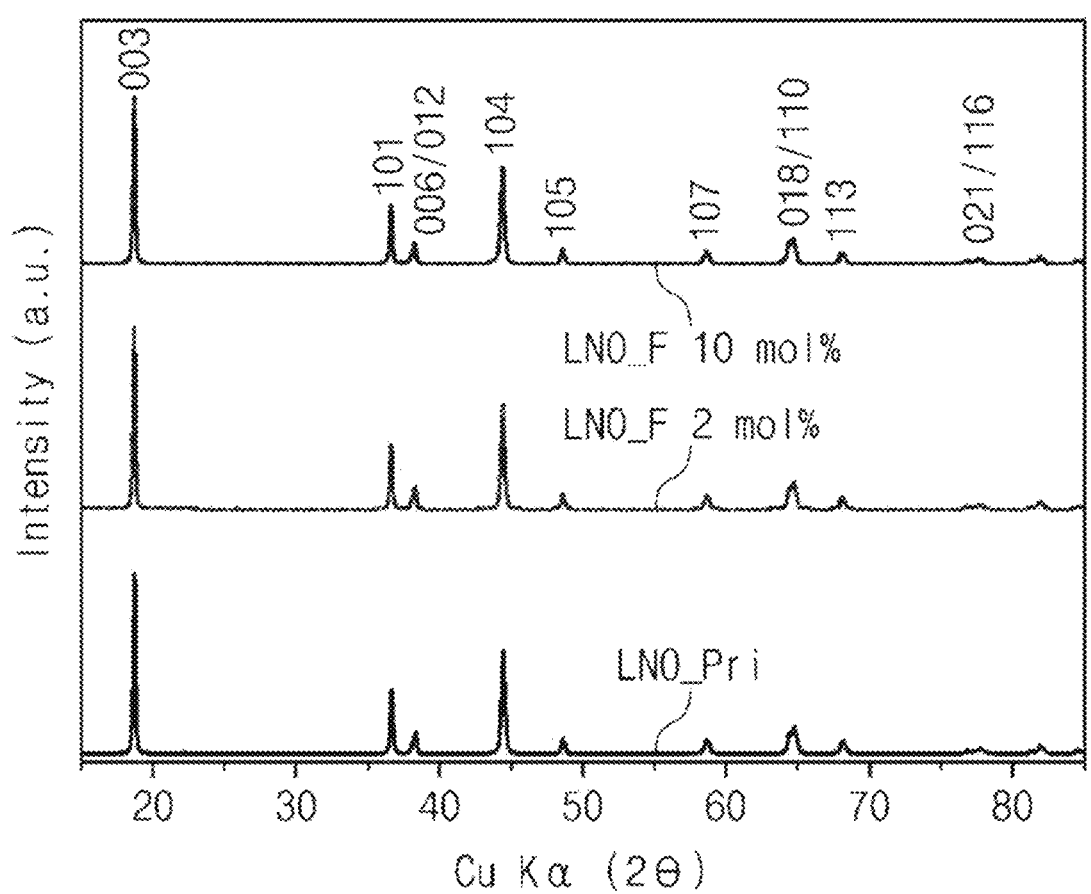

[Fig. 3]
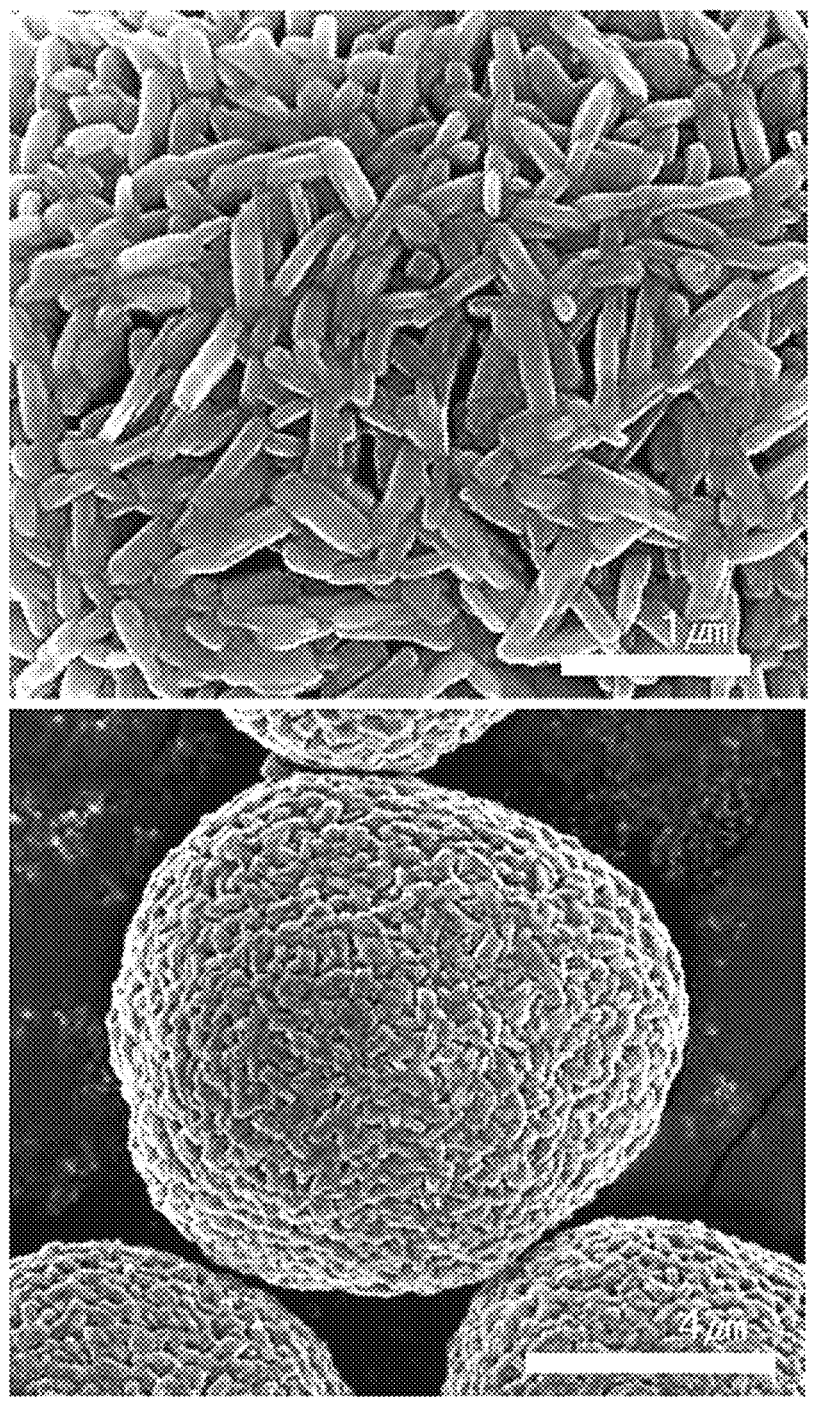

[Fig. 4]
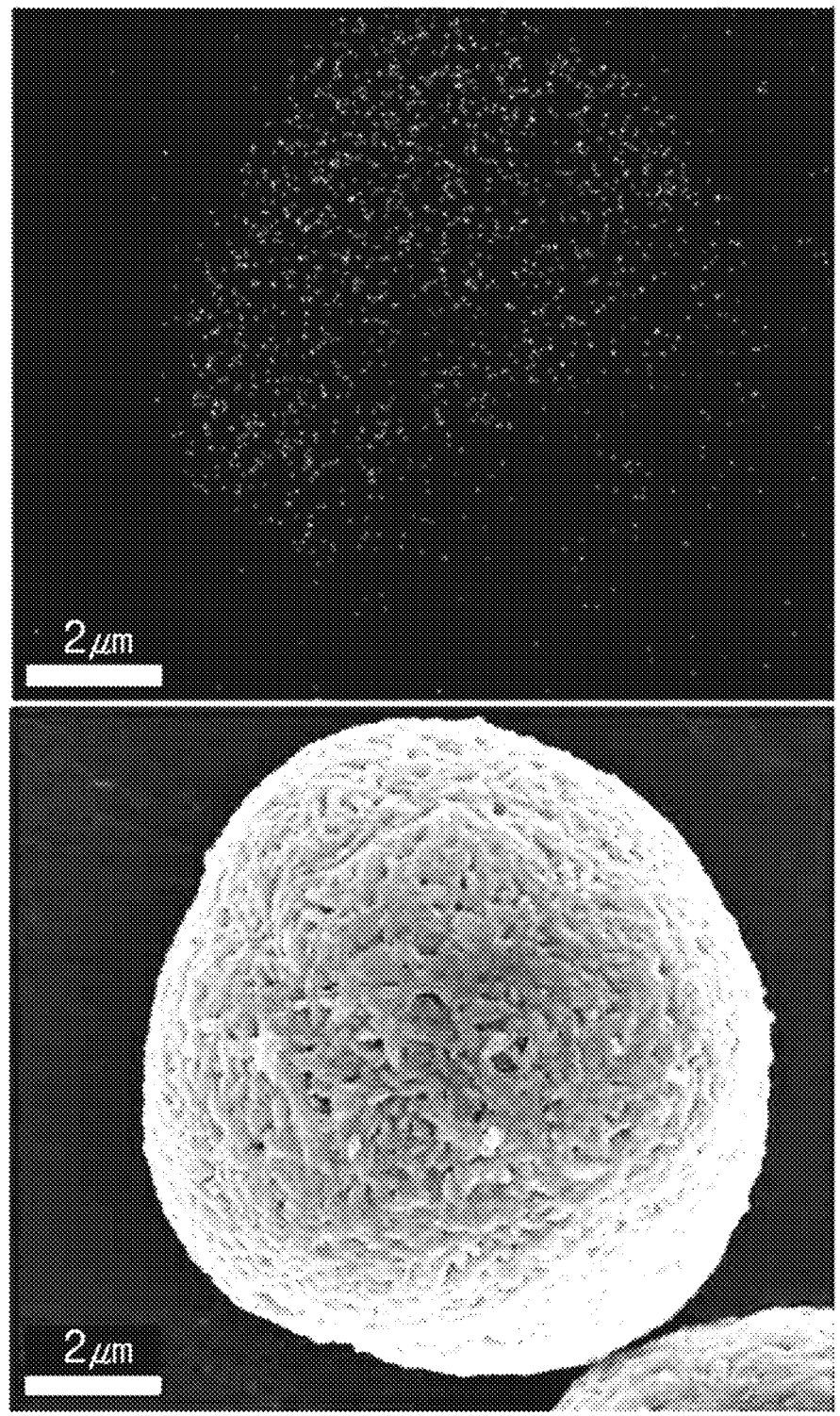

[Fig. 5]
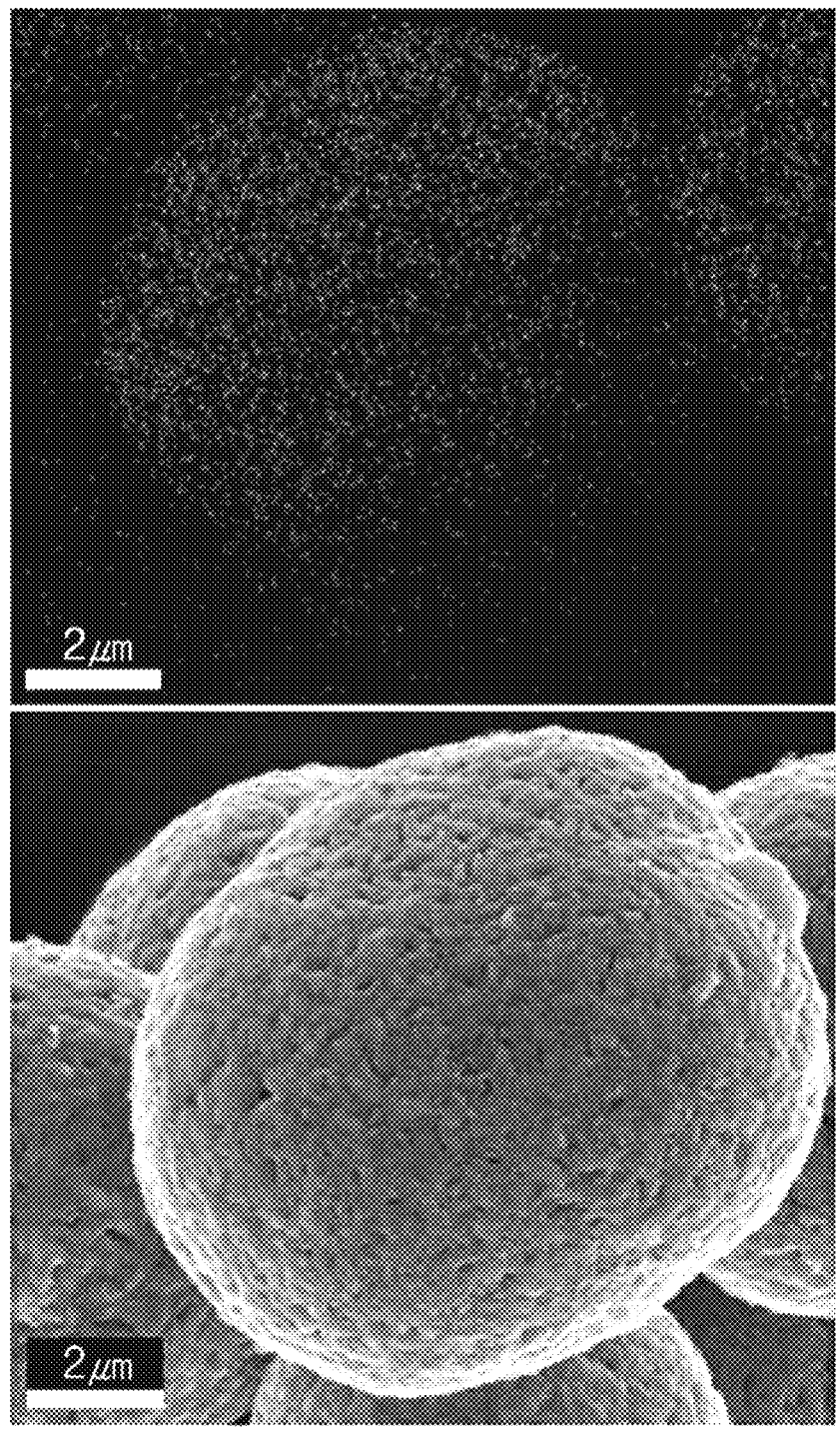

[Fig. 6]
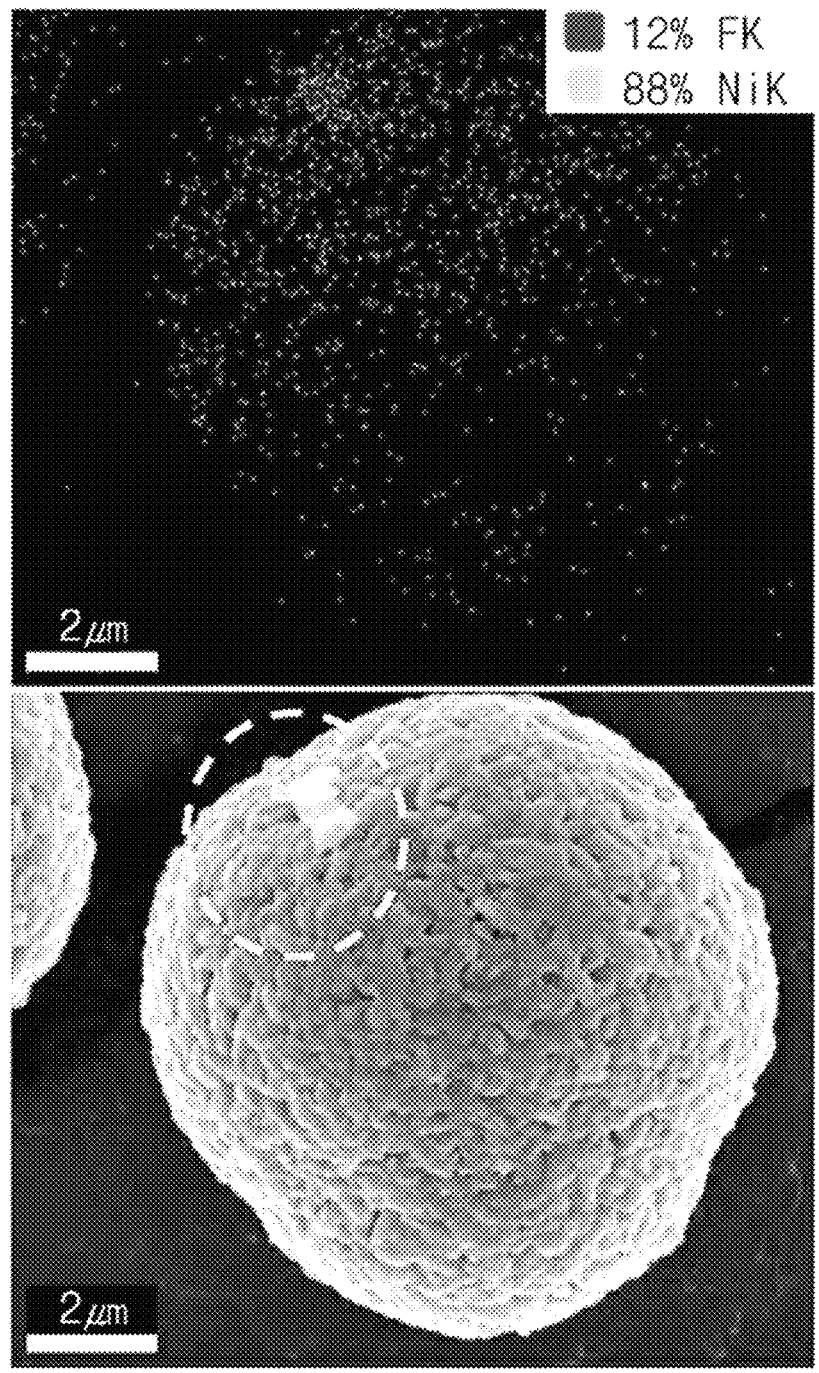

[Fig. 7]
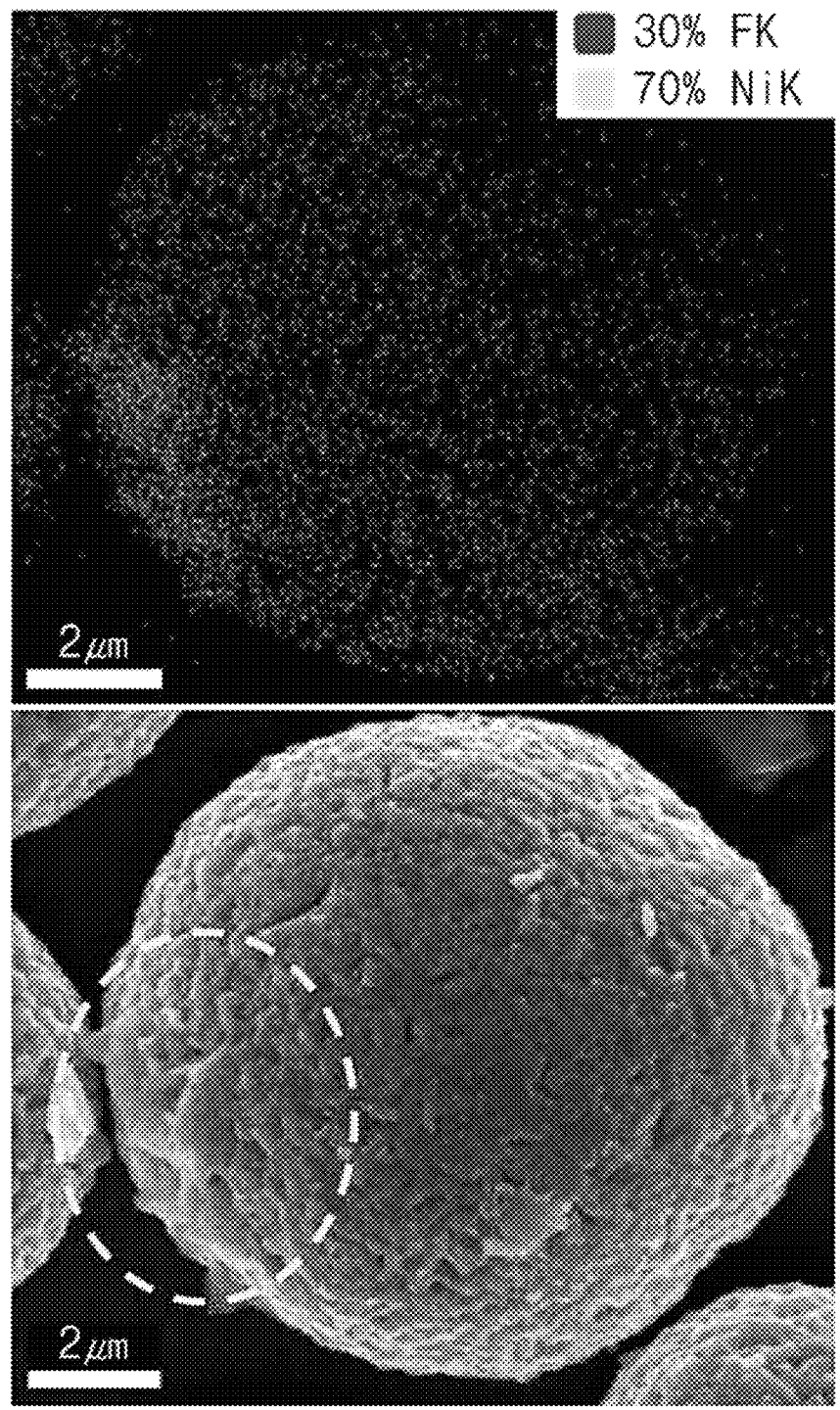

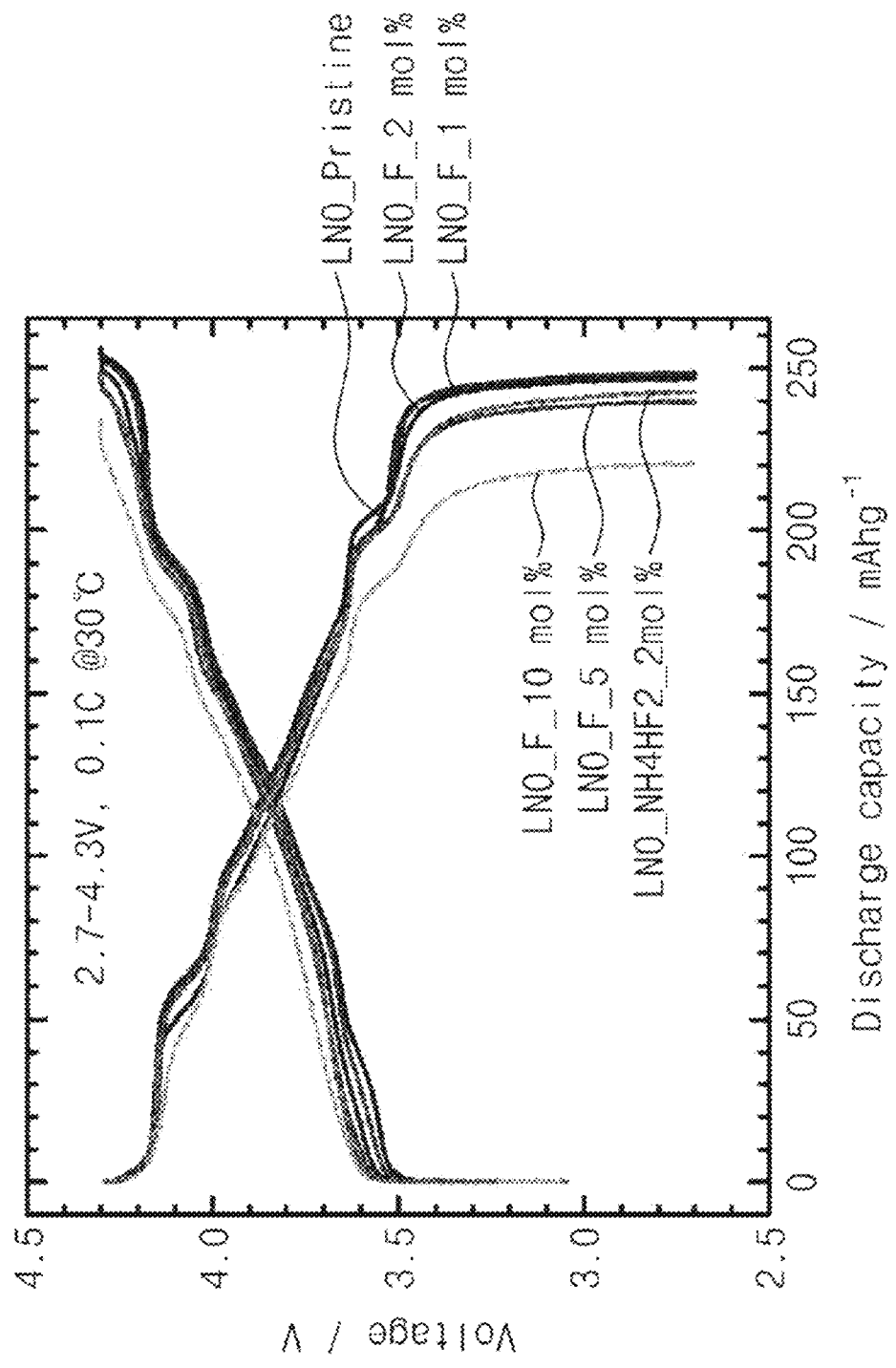
[Fig. 8]

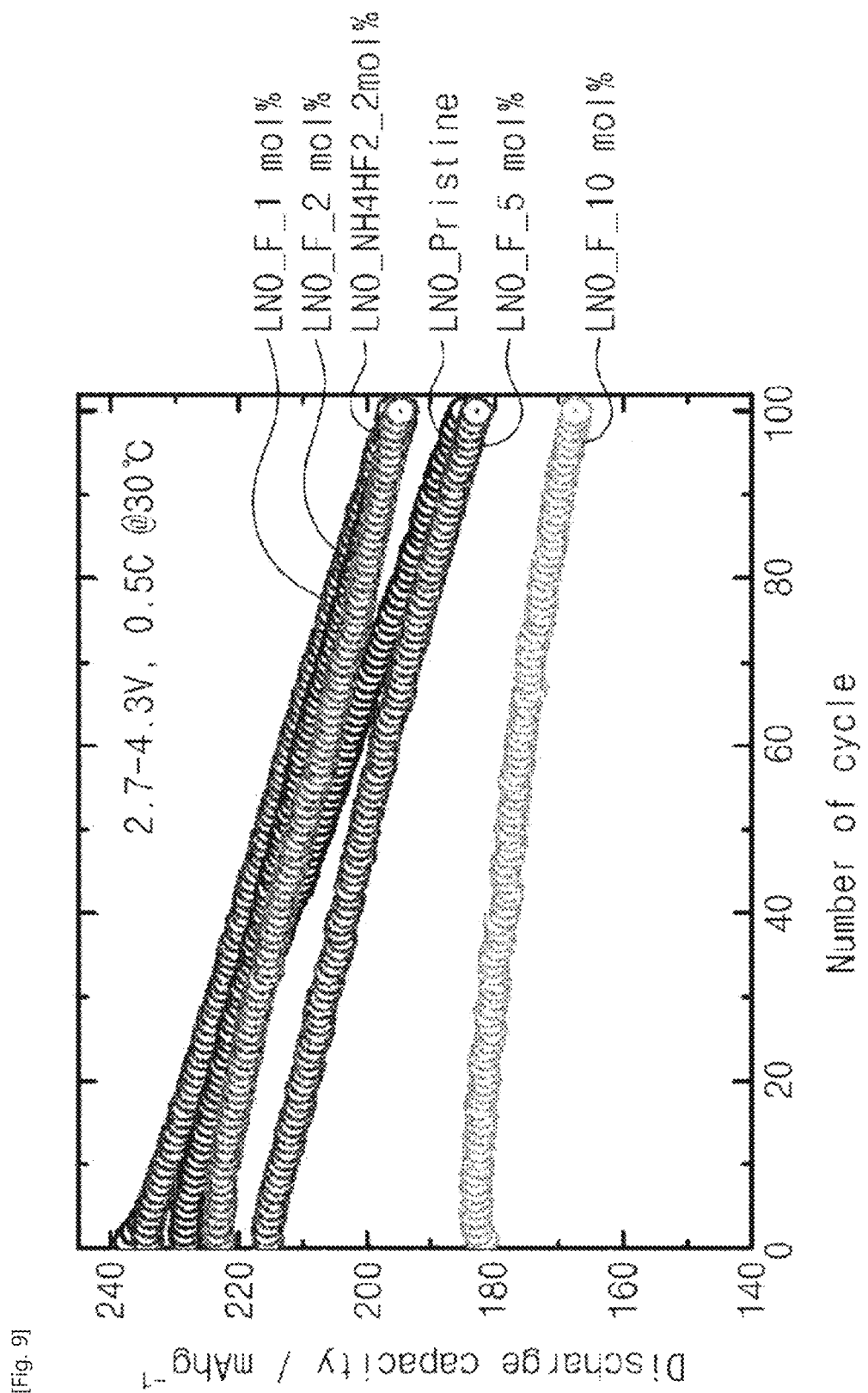
[Fig. 9]

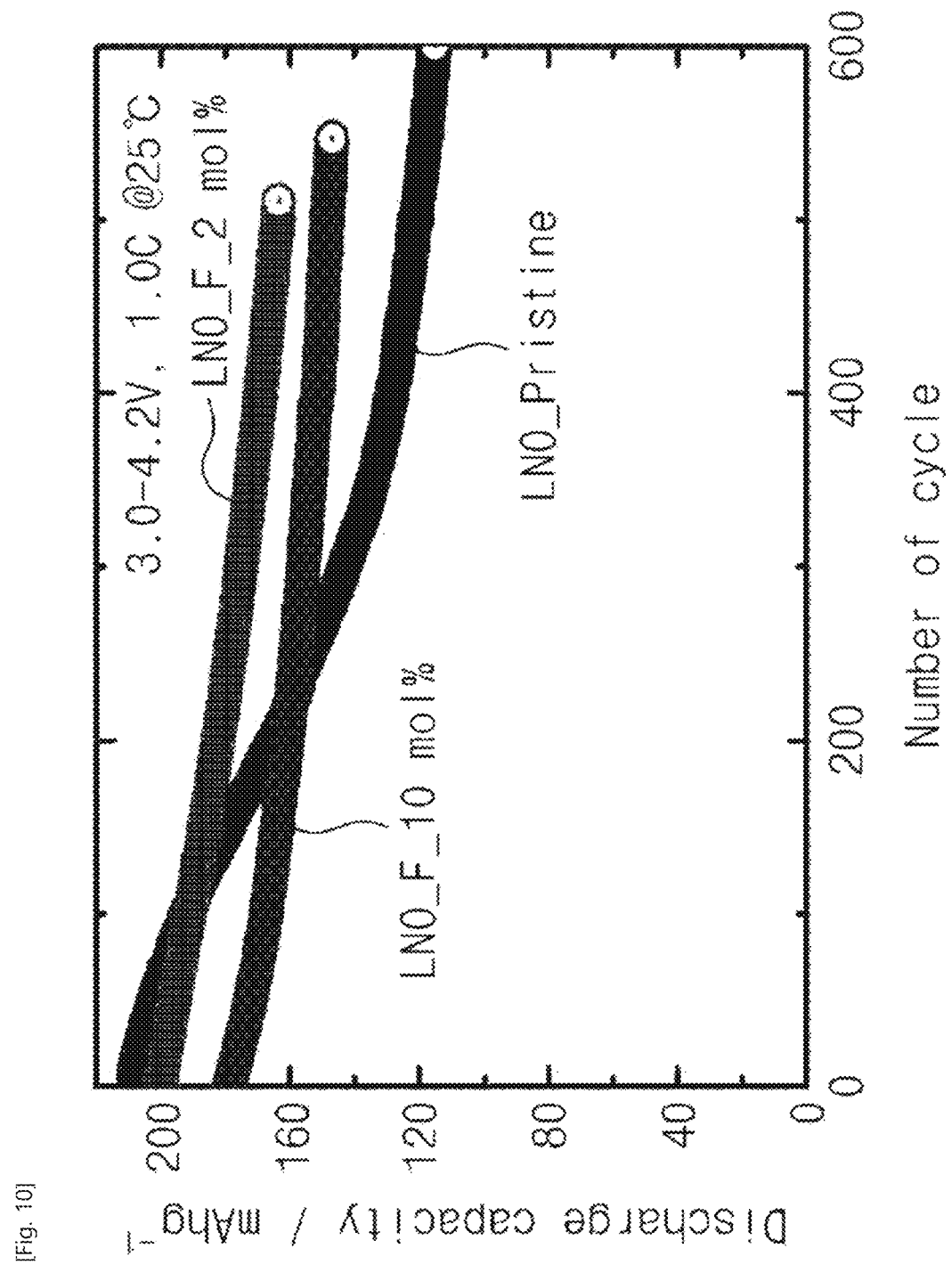
[Fig. 10]

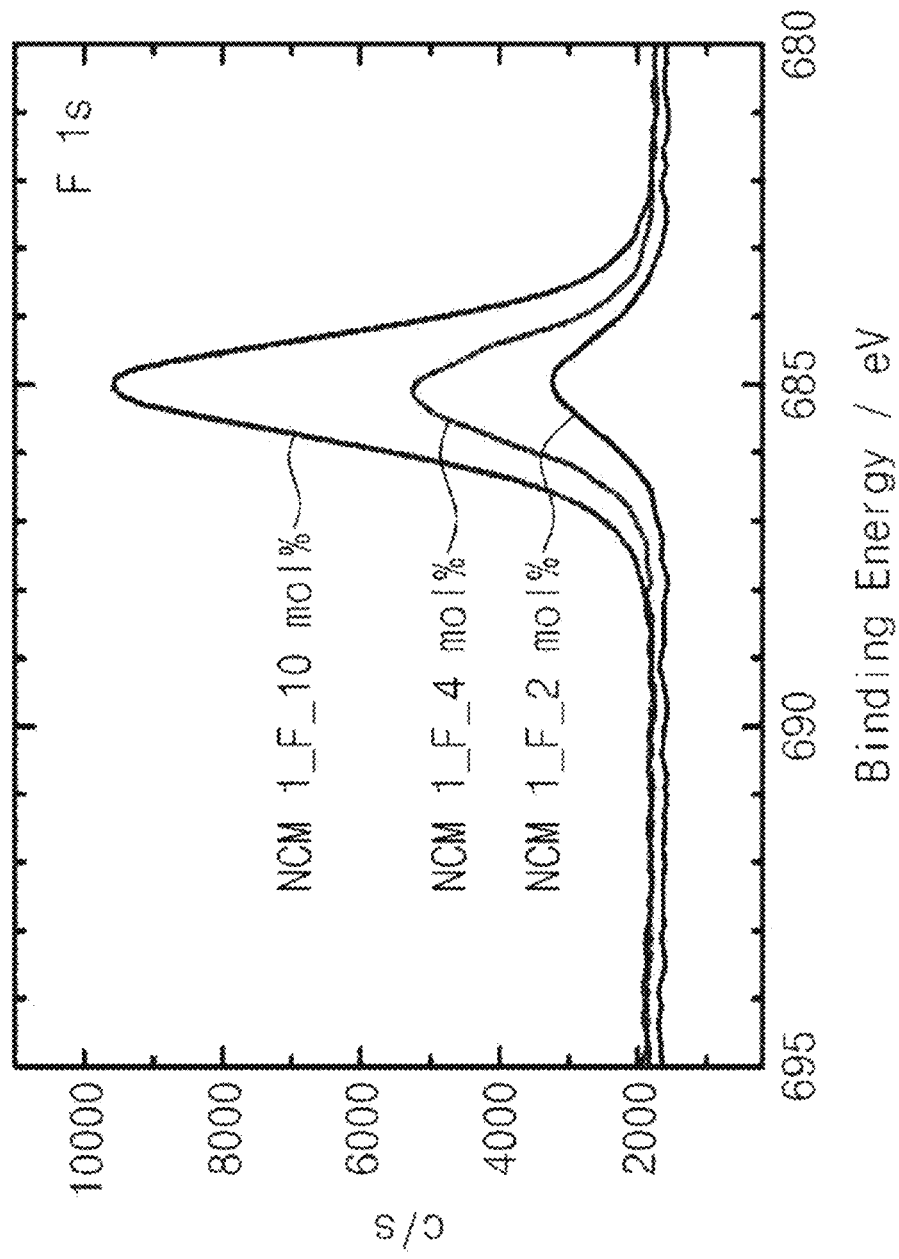

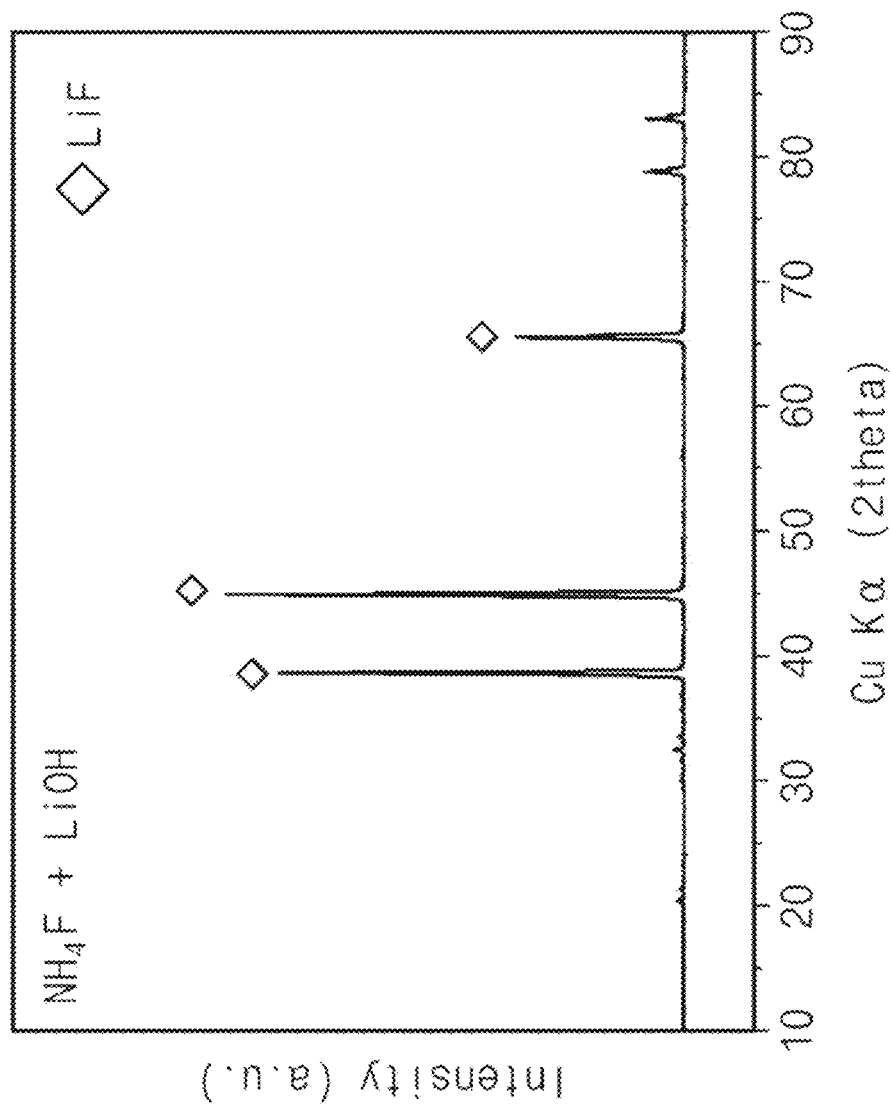
[Fig. 12]

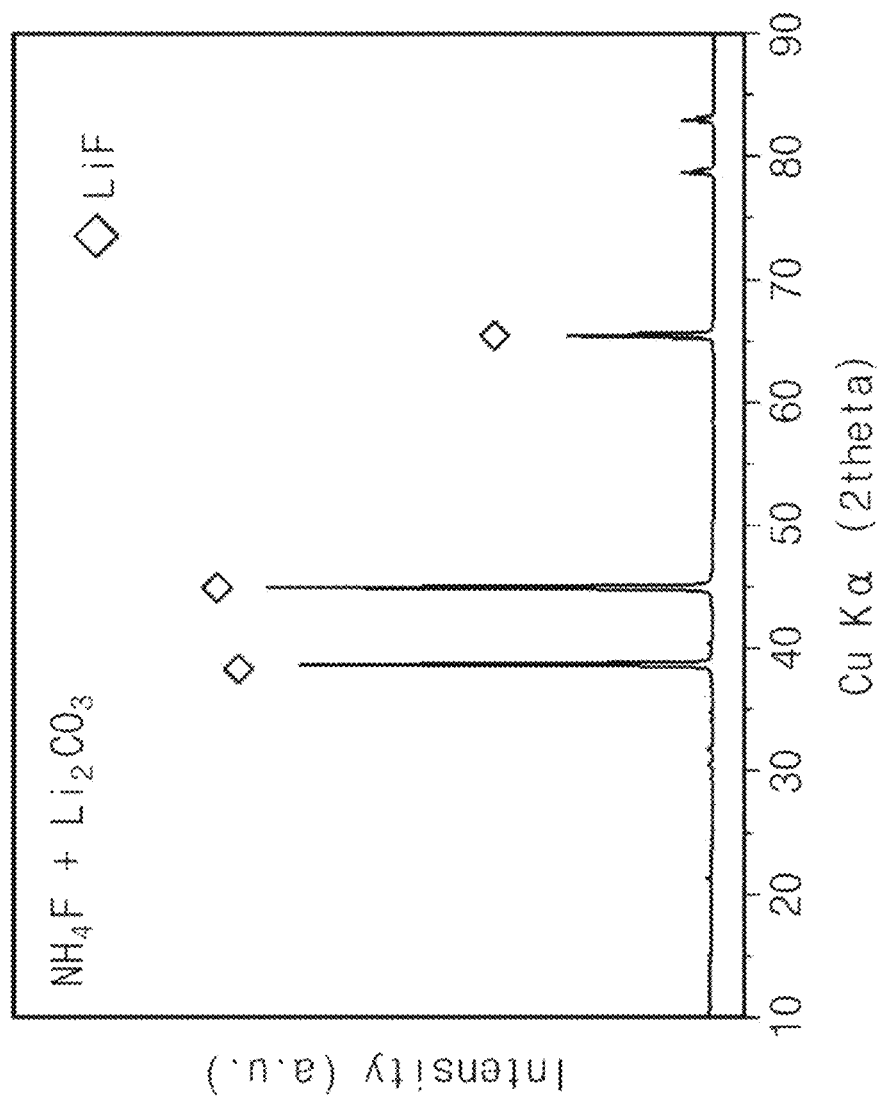
[Fig. 13]

[Fig. 14]
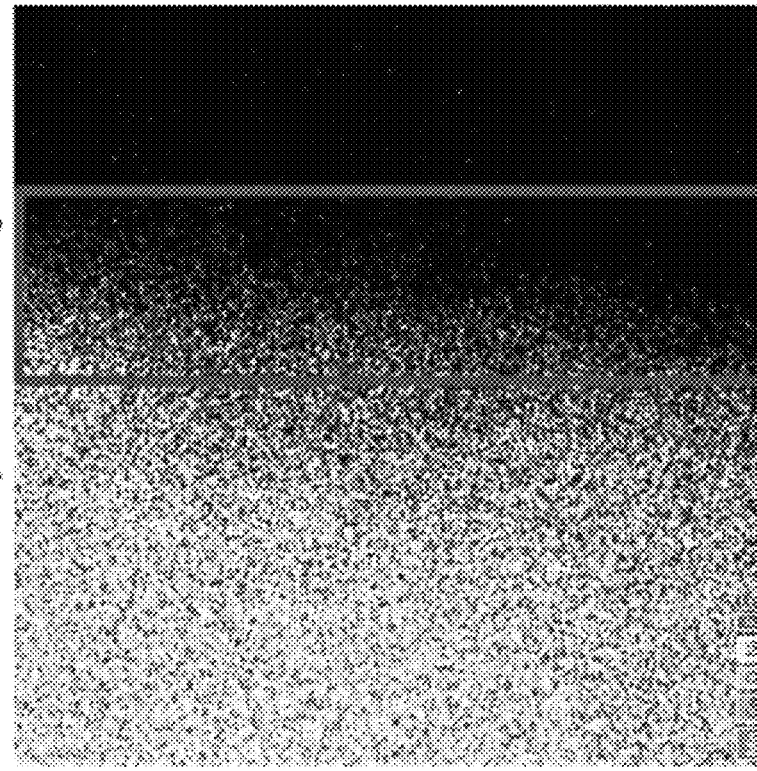
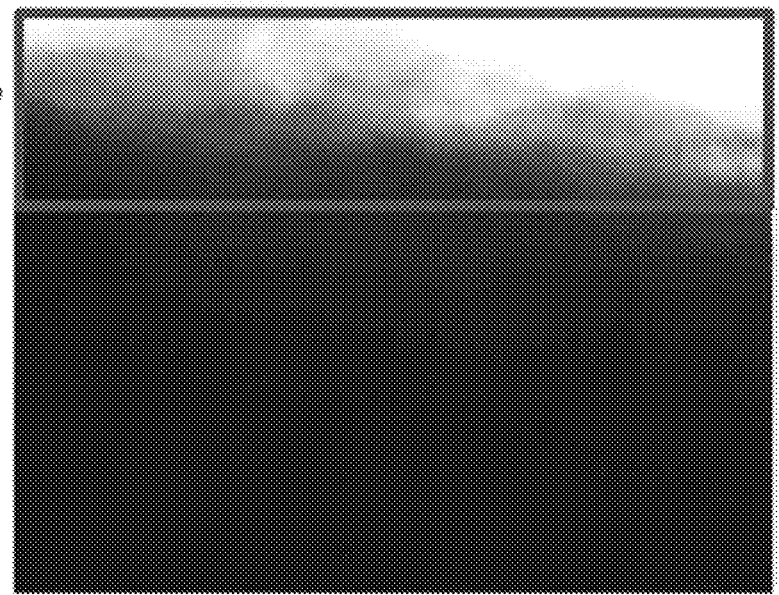

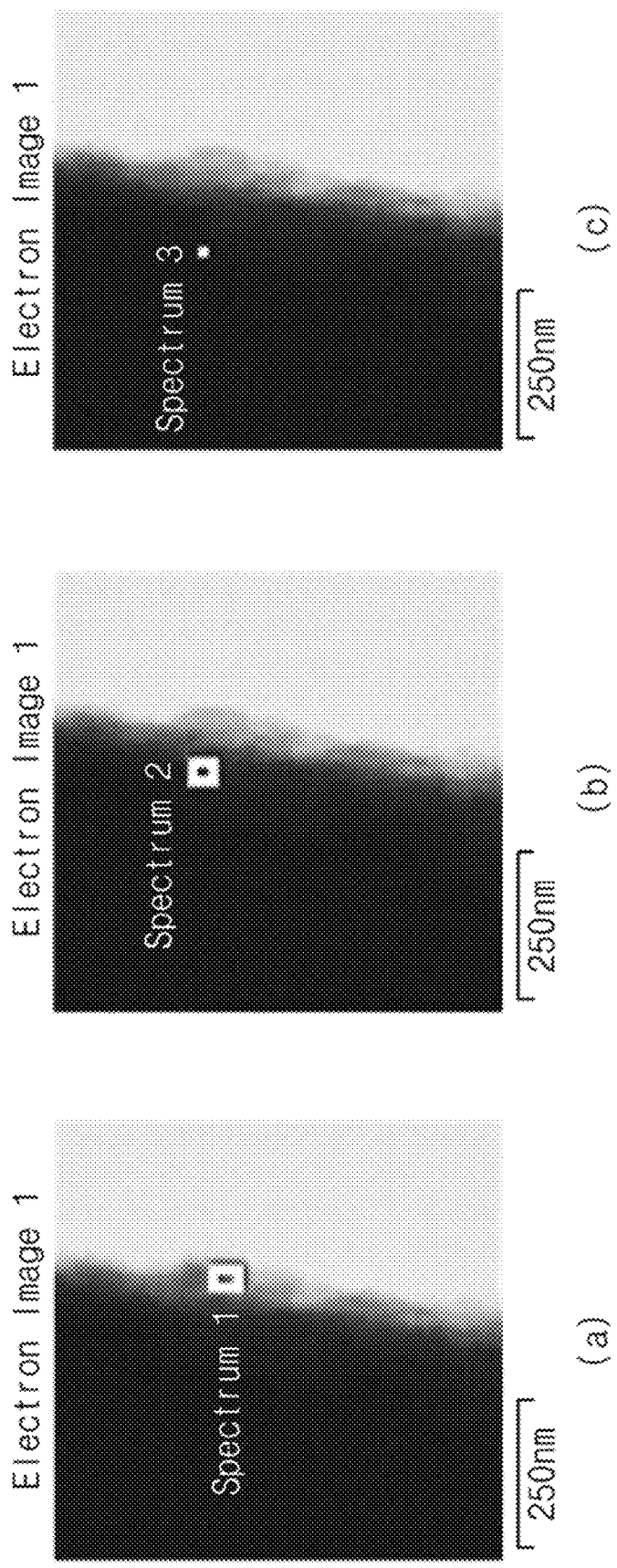
[Fig. 15]

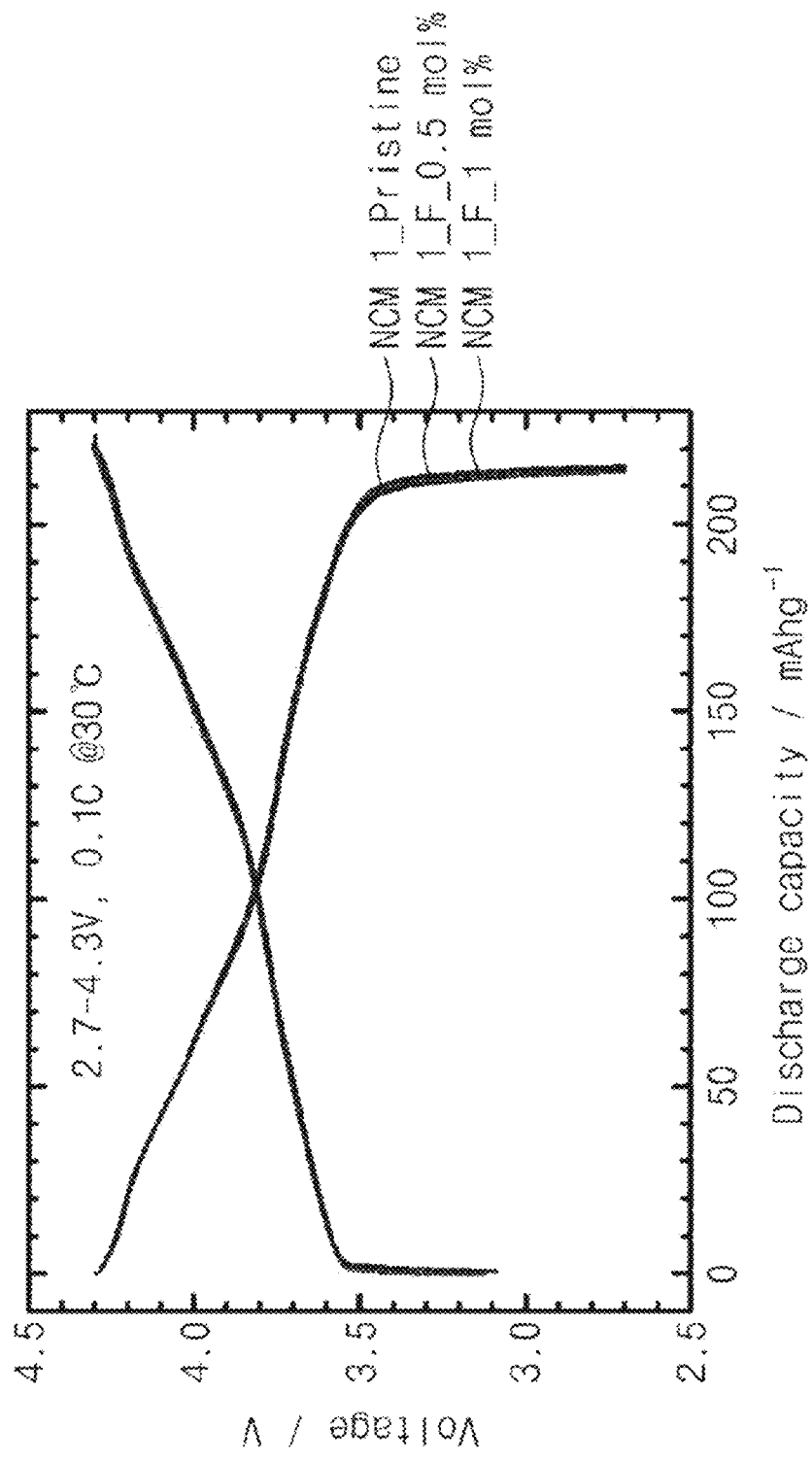
[Fig. 16]

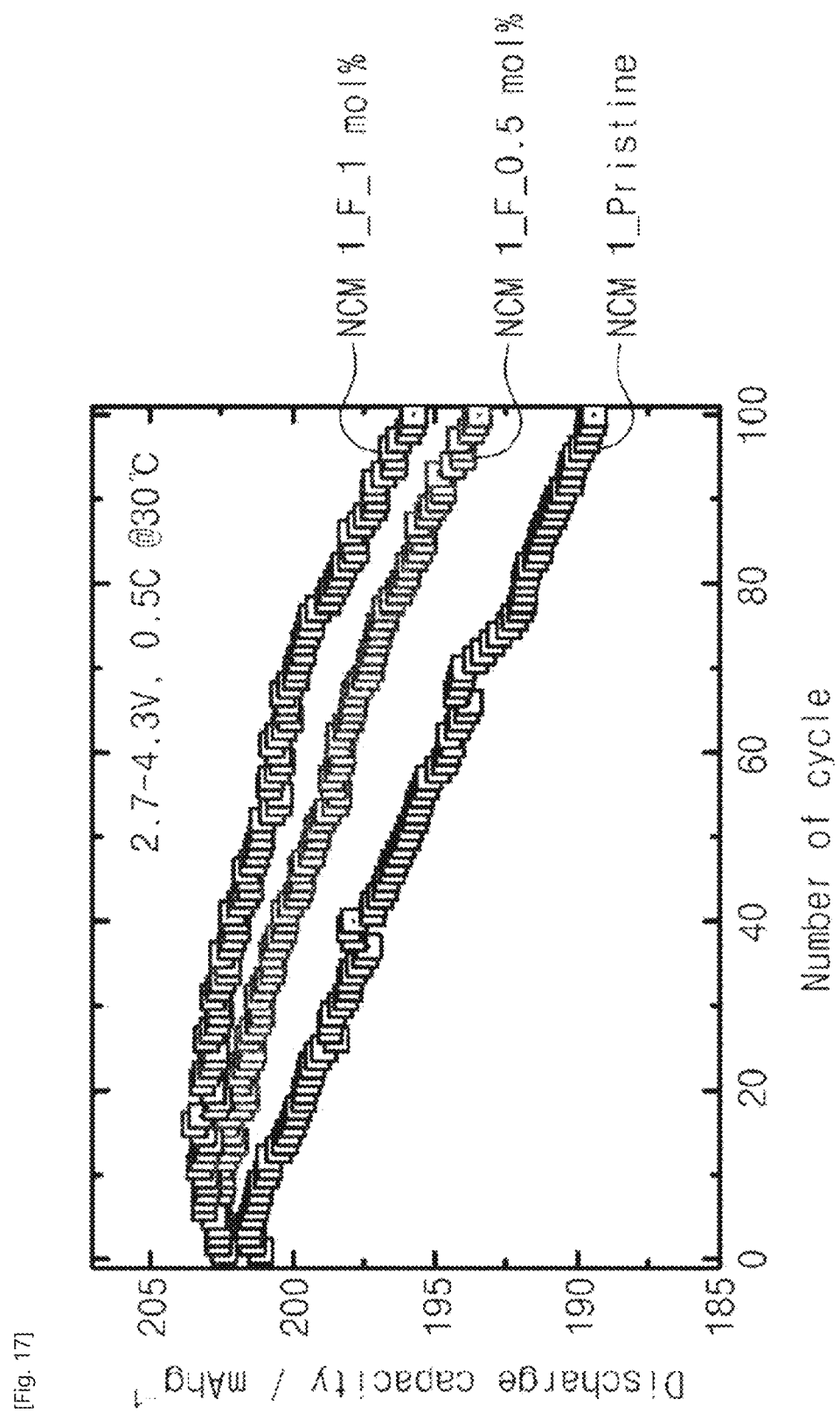
[Fig. 17]

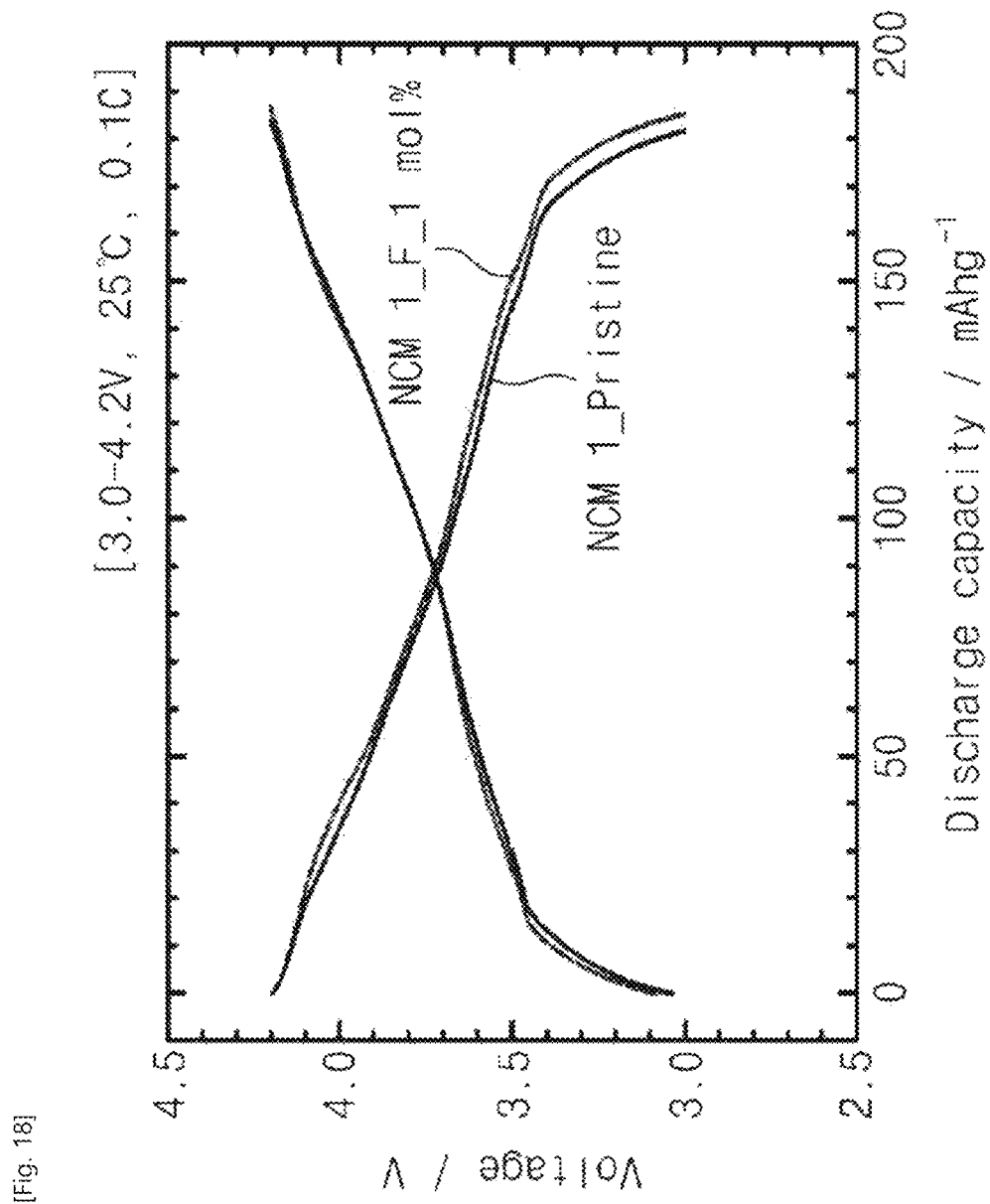
[Fig. 18]

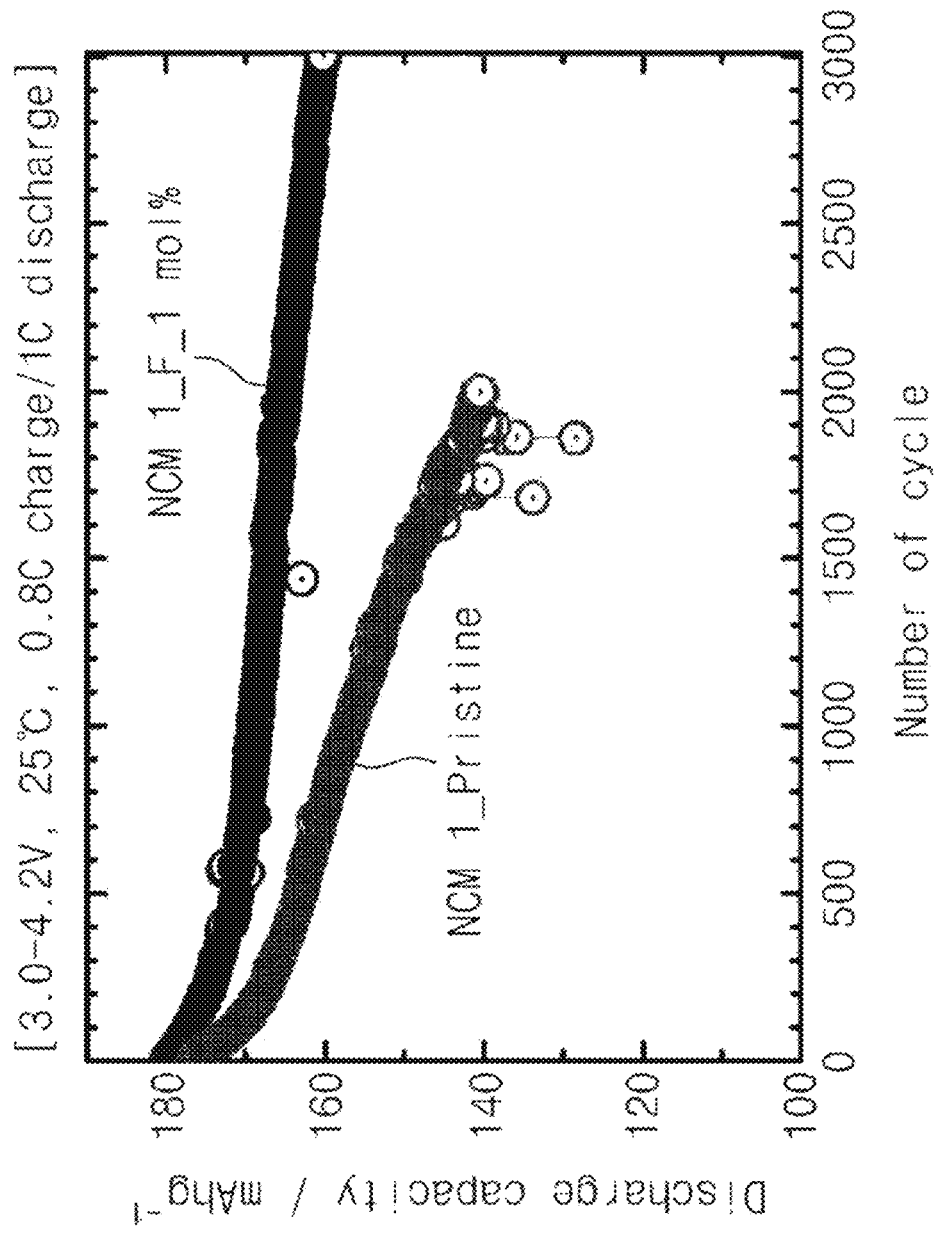
[Fig. 19]

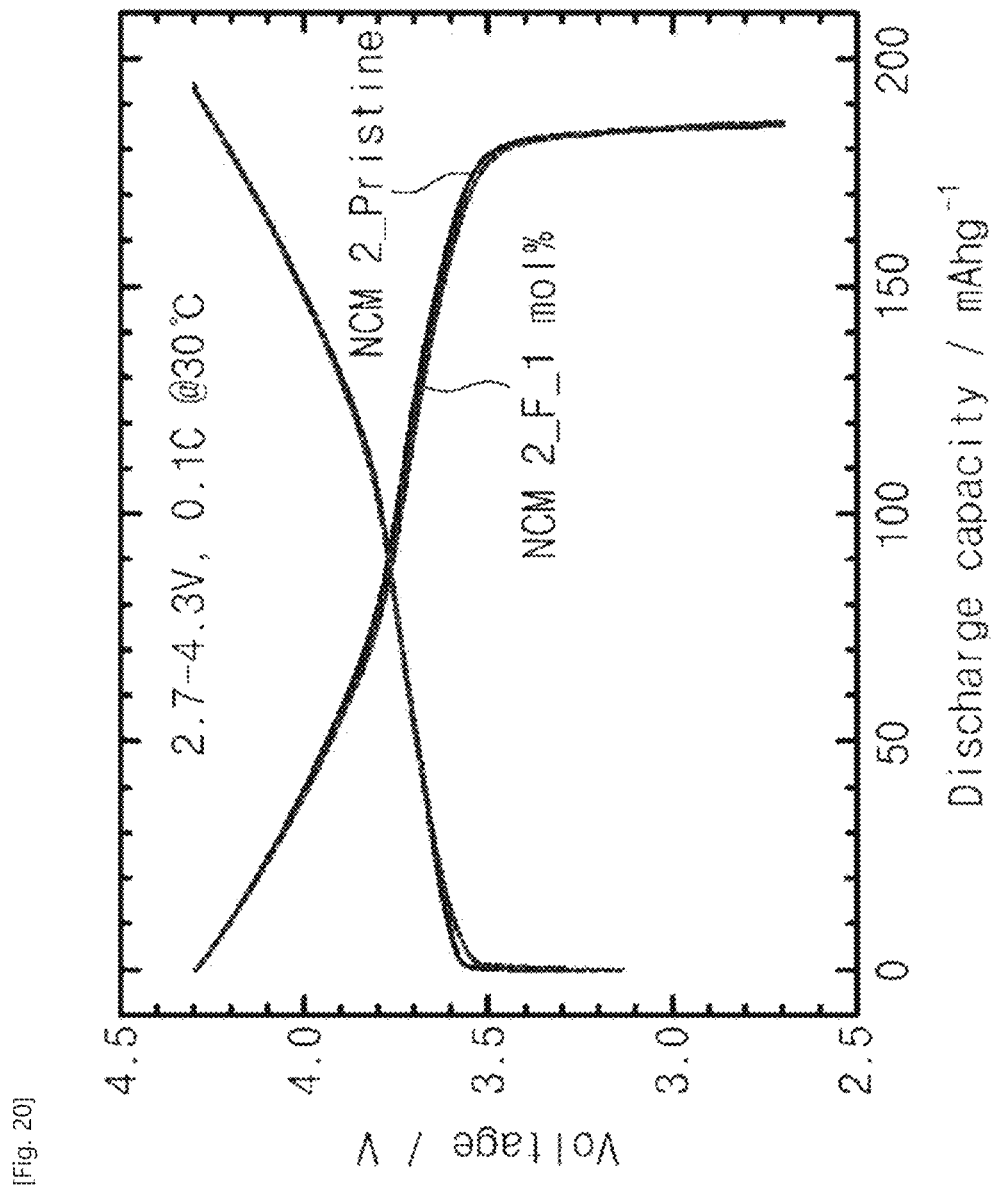
[Fig. 20]

[Fig. 21]
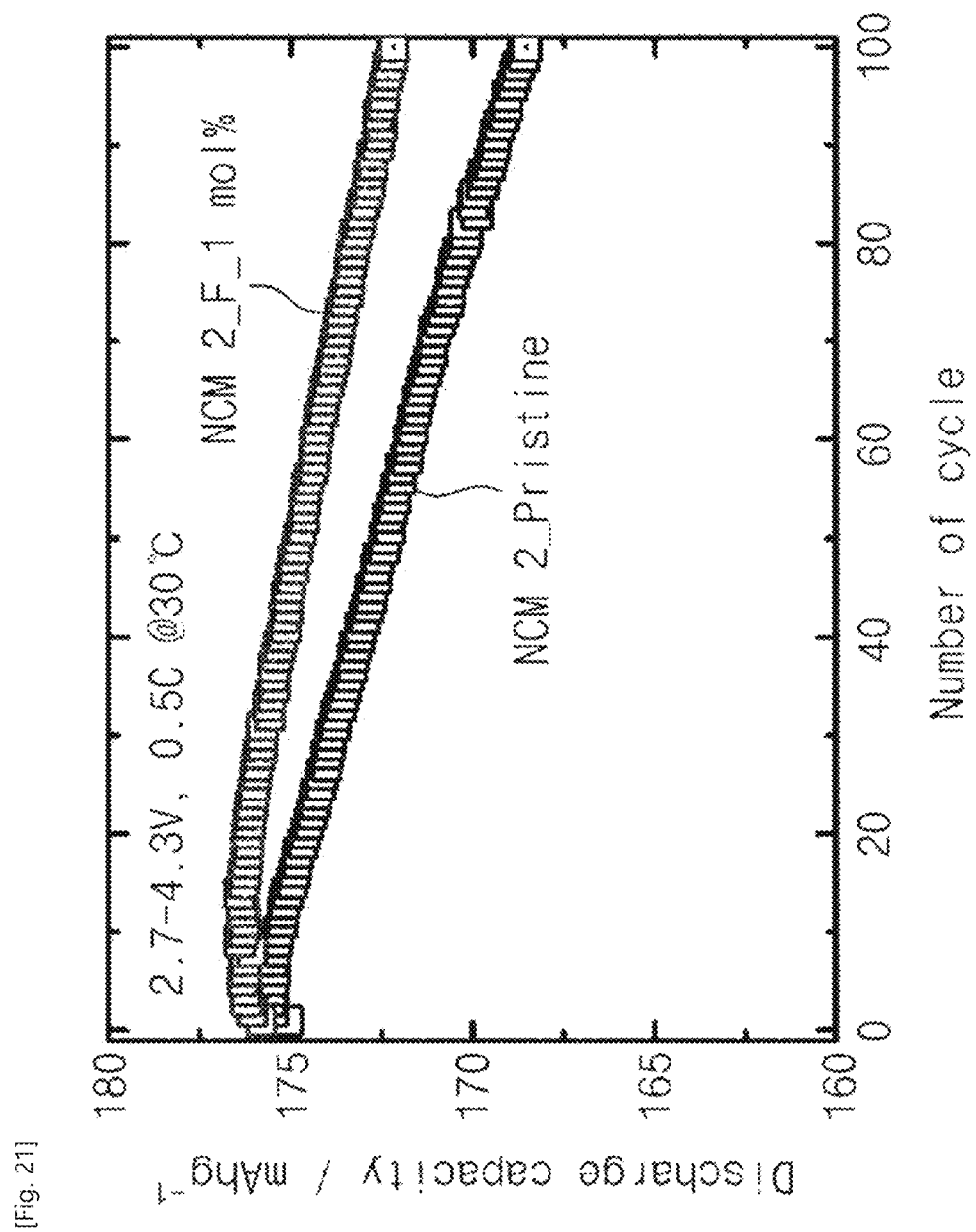

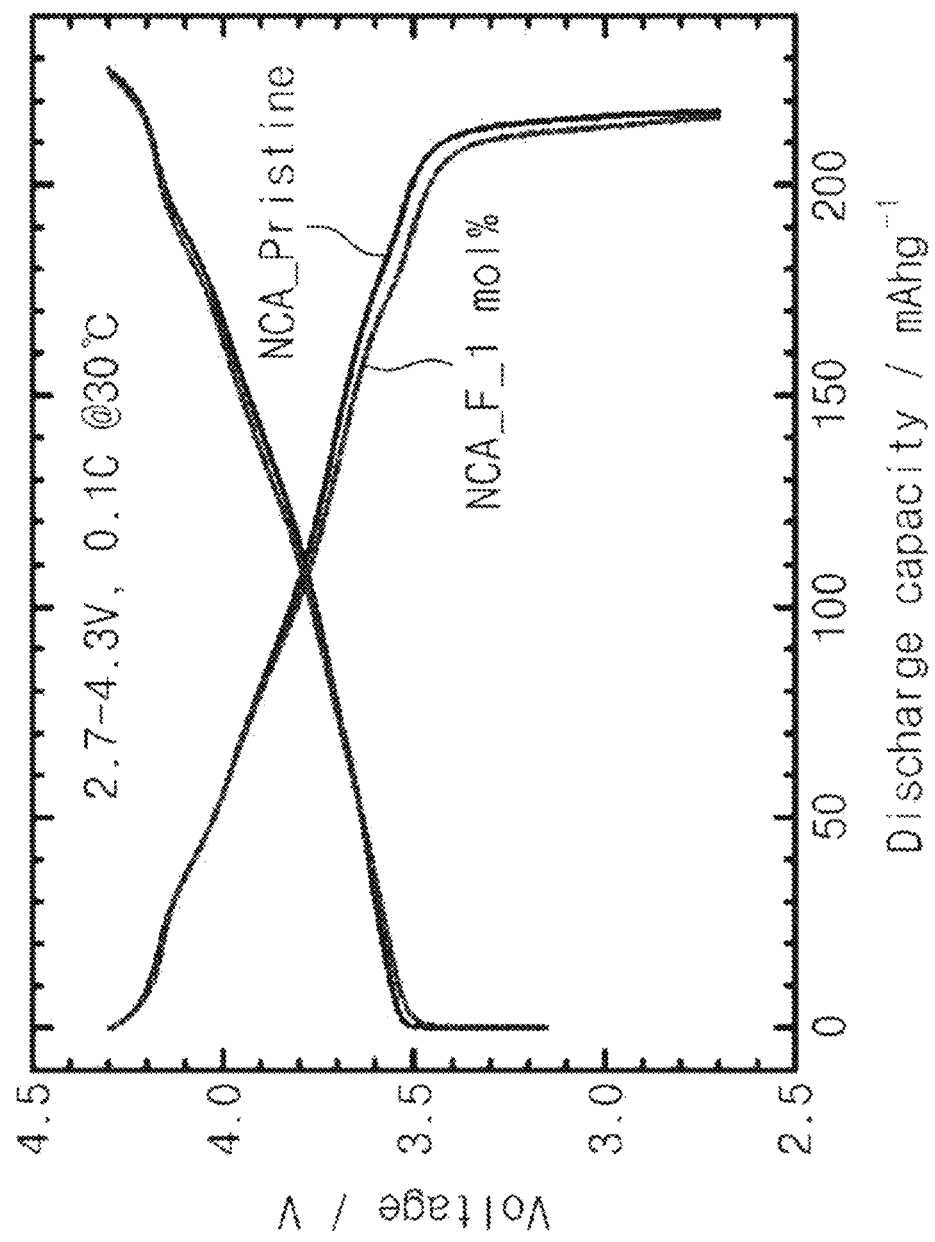
[Fig. 22]

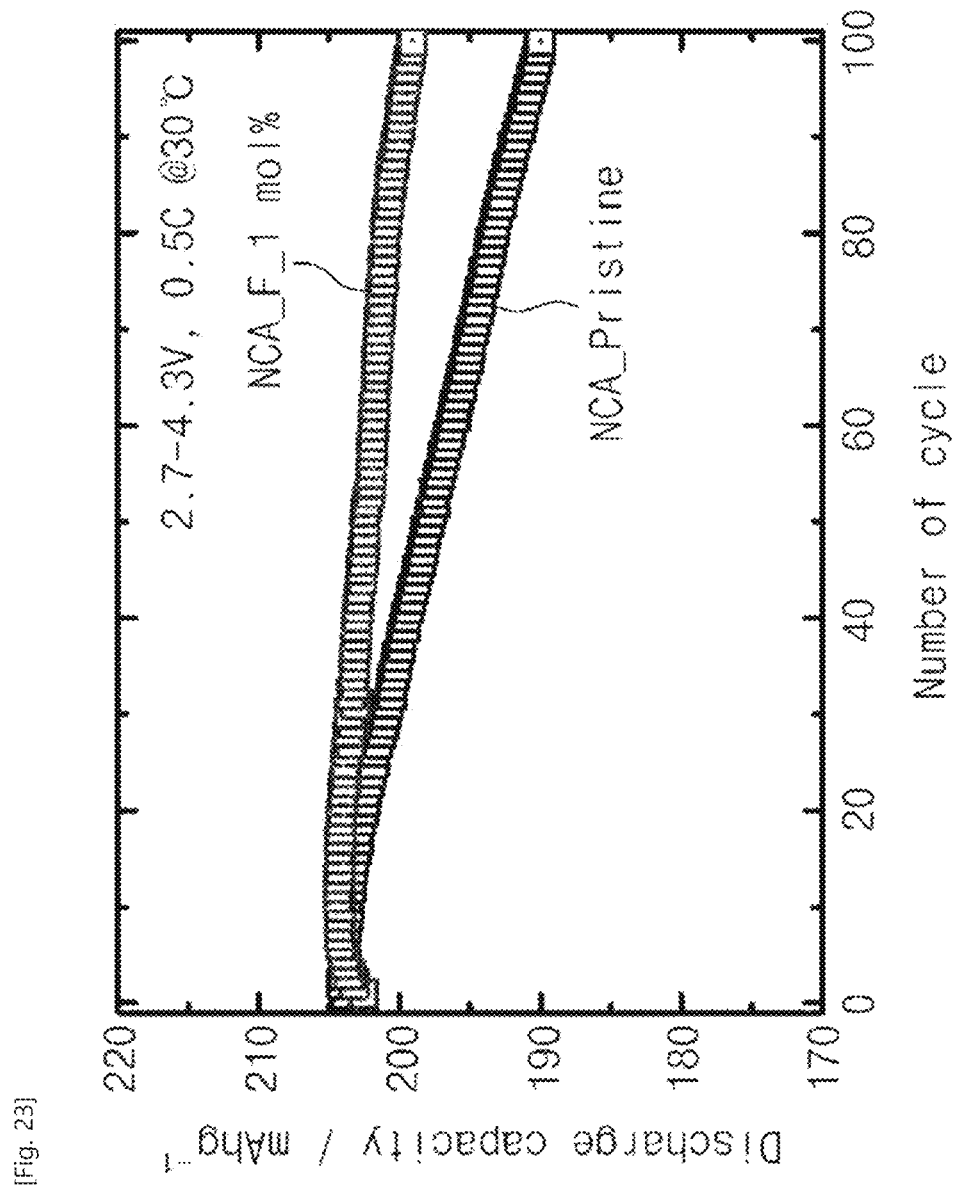
[Fig. 23]

[Fig. 24]
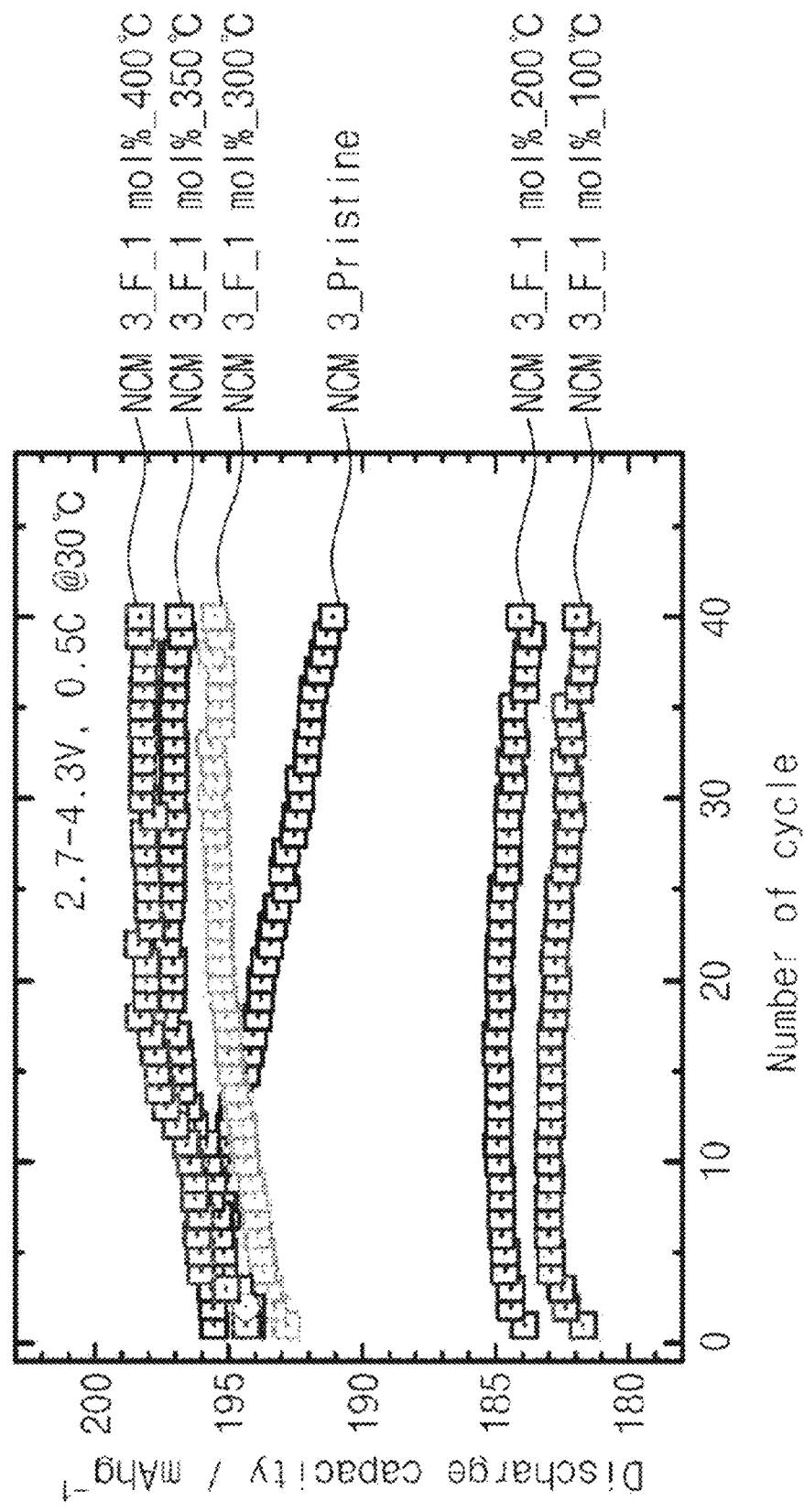

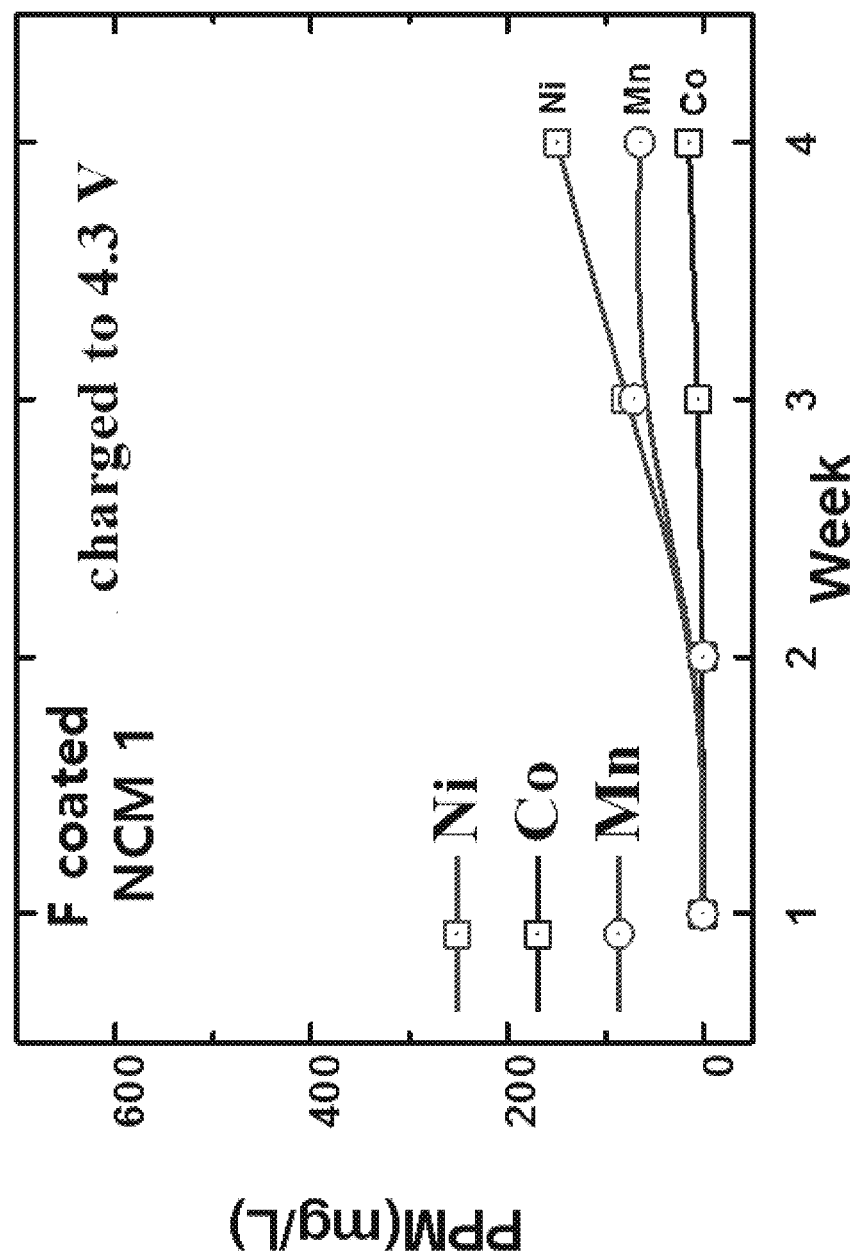
[Fig. 25]

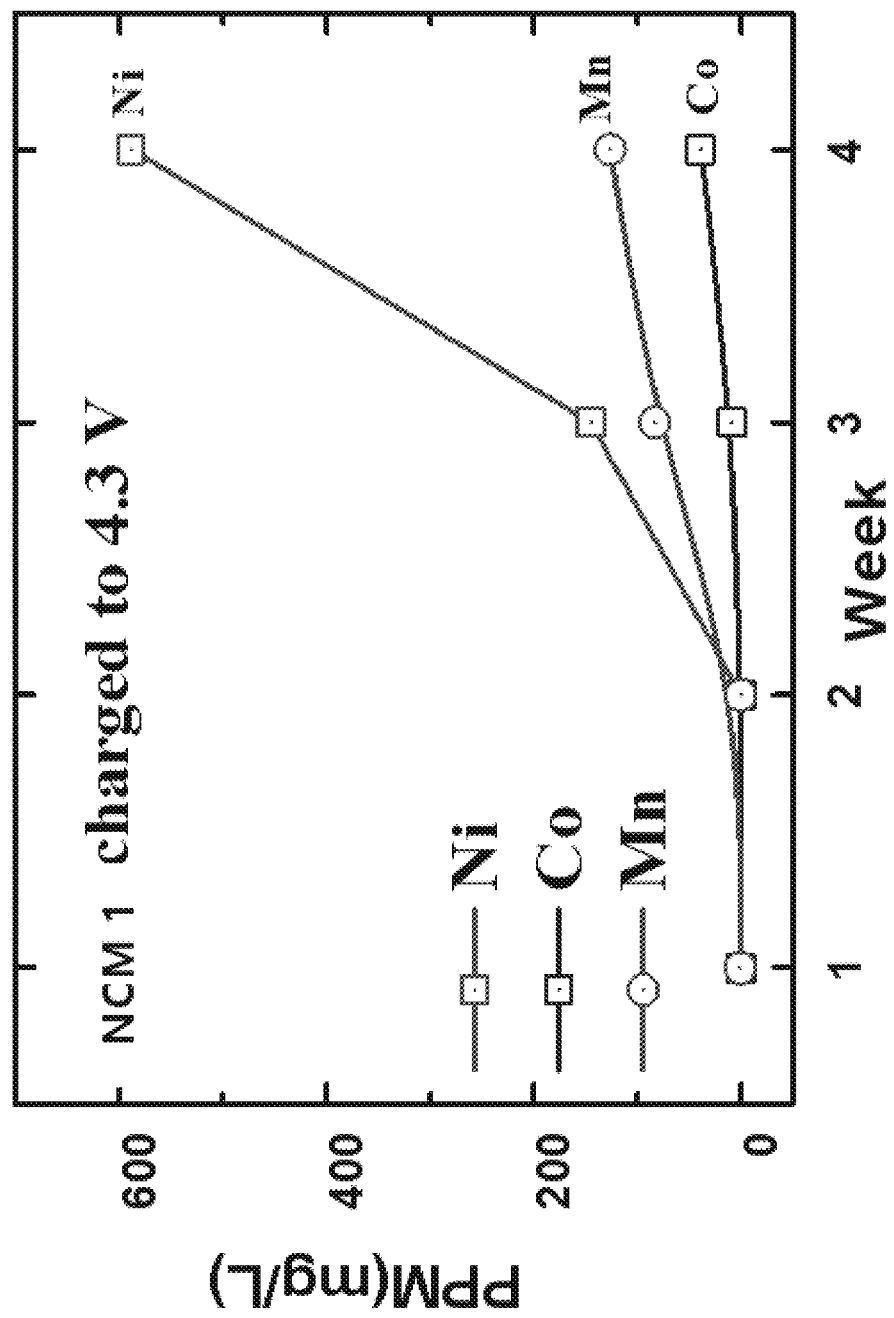
[Fig. 26]

CATHODE ACTIVE MATERIAL, METHOD FOR MANUFACTURING SAME, AND LITHIUM SECONDARY BATTERY COMPRISING SAME

CROSS-REFERENCE TO RELATED APPLICATION

This application is a continuation of U.S. application Ser. No. 16/171,665, filed Oct. 26, 2018 (allowed), which is a continuation of International Application No. PCT/KR2017/004634, which was filed on May 2, 2017 and claims priority to Korean Patent Application No. 10-2016-0052597, filed on Apr. 29, 2016, in the Korean Intellectual Property Office, the disclosures of which are hereby incorporated by reference in their entireties.

BACKGROUND

1. Field

The present disclosure relates to a positive active material, a method for manufacturing the same, and a lithium secondary battery including the same, and more particularly, to a positive active material including fluorine, a method for manufacturing the same, and a lithium secondary battery including the same.

2. Description of the Related Art

Secondary batteries capable of storing electrical energy have been increasingly demanded with the development of portable mobile electronic devices such as smart phones, MP3 players, and tablet personal computers. In particular, lithium secondary batteries have been increasingly demanded with the development of electric cars, medium and large energy storage systems, and portable devices requiring a high energy density.

Positive active materials used in the lithium secondary batteries have been studied due to the increase in demand for the lithium secondary batteries. For example, Korean Patent Publication No. 10-2014-0119621 (Application No. 10-2013-0150315) discloses a secondary battery which high-voltage capacity and long life characteristics by adjusting a kind and a composition of a metal substituted in a precursor by using the precursor for manufacturing a lithium-excessive positive active material and by adjusting a kind and an addition amount of an added metal.

SUMMARY

The present disclosure may provide a highly reliable positive active material, a method for manufacturing the same, and a lithium secondary battery including the same.

The present disclosure may also provide a high-capacity positive active material, a method for manufacturing the same, and a lithium secondary battery including the same.

The present disclosure may further provide a long-life positive active material, a method for manufacturing the same, and a lithium secondary battery including the same.

The present disclosure may further provide a positive active material with improved thermal stability, a method for manufacturing the same, and a lithium secondary battery including the same.

In an aspect, a method for manufacturing a positive active material may include forming a positive active material precursor including nickel, mixing and firing the positive active material precursor and lithium salt to form a preliminary positive active material particle, forming a coating material including fluorine on the preliminary positive active material particle by dry-mixing the preliminary positive active material particle with a coating source including fluorine, and manufacturing a positive active material particle by thermally treating the preliminary positive active material particle on which the coating material is formed.

In an embodiment, the preliminary positive active material particle may be dry-mixed with the coating source such that surface residual lithium of the preliminary positive active material particle is reduced.

In an embodiment, the amount of surface residual lithium of the positive active material particle may be less than the amount of surface residual lithium of the preliminary positive active material particle dry-mixed with the coating source.

In an embodiment, the coating material may react with surface residual lithium of the preliminary positive active material particle by the thermal treating of the preliminary positive active material particle to form a compound of lithium and fluorine.

In an embodiment, the positive active material precursor may further include at least one of cobalt, manganese, or aluminum.

In an embodiment, the coating source may include $NH_4F$ or $NH_4HF_2$.

In an embodiment, the positive active material precursor may include a first portion having a metal concentration gradient, and a second portion having a metal concentration gradient of which a magnitude is different from that of the metal concentration gradient of the first portion.

In an embodiment, the positive active material precursor may have a metal concentration gradient in a whole of a particle thereof.

In an embodiment, the positive active material precursor may include a core portion and a shell portion surrounding the core portion, and at least one of the core portion or the shell portion may have a metal concentration gradient.

In an aspect, a positive active material may include a positive active material particle including LiOH and $Li_2CO_3$ as surface residual lithium. The amount of $Li_2CO_3$ may be less than the amount of LiOH.

In an embodiment, the positive active material may further include a coating material including fluorine and provided on a surface of the positive active material particle.

In an embodiment, the coating material may include a compound of lithium and fluorine.

In an embodiment, the coating material may be provided in a layer form or in a particle form on the surface of the positive active material particle.

In an embodiment, a content of fluorine may become gradually less from the surface of the positive active material particle toward a central portion of the positive active material particle.

In an embodiment, a content of fluorine may be less than 5 mol %.

BRIEF DESCRIPTION OF THE DRAWINGS

The Application file contains at least one drawing executed in color. Copies of this Application publication with the color drawings will be provided by the Office upon request and payment of the necessary fee.

FIG. 1 is a flowchart illustrating a method for manufacturing a positive active material according to some embodiments of the inventive concepts.

FIG. 2 is an X-ray diffraction (XRD) graph of positive active material particles according to a comparative example 1, an embodiment 2 and an embodiment 5.

FIG. 3 shows scanning electron microscope (SEM) images of the positive active material particle according to the comparative example 1.

FIGS. 4 and 5 show SEM images and energy dispersive spectrometer (EDS) mapping data images of positive active materials obtained by applying coating sources of the embodiments 2 and 5 and ball mill processes (1 hour) to preliminary positive active material particles, respectively.

FIGS. 6 and 7 show SEM images and EDS mapping data images of positive active materials obtained by applying the coating sources of the embodiments 2 and 5 and hand mixing processes (10 minutes) to preliminary positive active material particles, respectively.

FIG. 8 is a graph showing charge/discharge characteristics of secondary batteries including positive active materials according to embodiments 1 to 5 of the inventive concepts and the comparative example 1. In FIGS. 6 and 7, "K" of FK and NiK means that the light is emitted from the K-shell of the respective elements.

FIG. 9 is a graph showing life characteristics of the secondary batteries including the positive active materials according to the embodiments 1 to 5 of the inventive concepts and the comparative example 1.

FIG. 10 is a graph showing life characteristics of the secondary batteries including the positive active materials according to the embodiments 2 and 5 of the inventive concepts and the comparative example 1.

FIG. 11 is a graph showing X-ray photoelectron spectroscopy (XPS) measurement data of positive active materials according to embodiments 8 to 10 of the inventive concepts. In FIG. 11, "NCM" stands for "Ni," "Co," and "Mn" of the positive active materials.

FIG. 12 is a graph for checking a reaction result of LiOH and $NH_4F$.

FIG. 13 is a graph for checking a reaction result of $Li_2CO_3$ and $NH_4F$.

FIG. 14 shows a transmission electron microscope (TEM) image and an EDS mapping data image of the positive active material according to the embodiment 10 of the inventive concepts.

FIG. 15 shows TEM images of the positive active material according to the embodiment 10 of the inventive concepts.

FIG. 16 is a graph showing charge/discharge characteristics of secondary batteries including positive active materials according to embodiments 6 and 7 of the inventive concepts and a comparative example 2. In FIG. 16, "NCM" stands for "Ni," "Co," and "Mn" of the positive active materials.

FIG. 17 is a graph showing life characteristics of the secondary batteries including the positive active materials according to the embodiments 6 and 7 of the inventive concepts and the comparative example 2. In FIG. 17, "NCM" stands for "Ni," "Co," and "Mn" of the positive active materials.

FIG. 18 is a graph showing charge/discharge characteristics of the secondary batteries including the positive active materials according to the embodiment 7 of the inventive concepts and the comparative example 2. In FIG. 18, "NCM" stands for "Ni," "Co," and "Mn" of the positive active materials.

FIG. 19 is a graph showing life characteristics of the secondary batteries including the positive active materials according to the embodiment 7 of the inventive concepts and the comparative example 2. In FIG. 19, "NCM" stands for "Ni," "Co," and "Mn" of the positive active materials.

FIG. 20 is a graph showing charge/discharge characteristics of secondary batteries including positive active materials according to an embodiment 11 of the inventive concepts and a comparative example 3. In FIG. 20, "NCM" stands for "Ni," "Co," and "Mn" of the positive active materials.

FIG. 21 is a graph showing life characteristics of the secondary batteries including the positive active materials according to the embodiment 11 of the inventive concepts and the comparative example 3. In FIG. 21, "NCM" stands for "Ni," "Co," and "Mn" of the positive active materials.

FIG. 22 is a graph showing charge/discharge characteristics of secondary batteries including positive active materials according to an embodiment 12 of the inventive concepts and a comparative example 4. In FIG. 22, "NCA" stands for "Ni," "Co," and "Al" of the positive active materials.

FIG. 23 is a graph showing life characteristics of the secondary batteries including the positive active materials according to the embodiment 12 of the inventive concepts and the comparative example 4. In FIG. 23, "NCA" stands for "Ni," "Co," and "Al" of the positive active materials.

FIG. 24 is a graph showing life characteristics of secondary batteries including positive active materials according to embodiments 13 to 17 of the inventive concepts and a comparative example 5. In FIG. 24, "NCM" stands for "Ni," "Co," and "Mn" of the positive active materials.

FIG. 25 is a graph for checking metal elution of the positive active material according to the embodiment 7 of the inventive concepts.

FIG. 26 is a graph for checking metal elution of the positive active material according to the comparative example 2.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having"

when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Furthermore, as used herein, the term "mol %" means a content of an element included in a positive active material or positive active material precursor on the assumption that a sum of the other elements in the positive active material or positive active material precursor except lithium and oxygen is 100%.

FIG. 1 is a flowchart illustrating a method for manufacturing a positive active material according to some embodiments of the inventive concepts.

Referring to FIG. 1, a positive active material precursor including nickel is formed (S110). The positive active material precursor may include nickel. Alternatively, the positive active material precursor may include at least one of nickel, cobalt, or manganese. For example, the positive active material precursor may include a compound of nickel, oxygen and hydrogen, a compound of nickel, cobalt, manganese, oxygen and hydrogen, or a compound of nickel, cobalt, aluminum, oxygen and hydrogen.

According to an embodiment, at least one metal may have a concentration gradient in a portion of the positive active material precursor. For example, the positive active material precursor may include a first portion having a metal concentration gradient, and a second portion having a metal concentration gradient of which a magnitude is different from that of the metal concentration gradient of the first portion.

Alternatively, according to another embodiment, the positive active material precursor may have a metal concentration gradient in the whole of a particle thereof. According to still another embodiment, a concentration of the metal may be substantially constant in the positive active material precursor. According to yet another embodiment, the positive active material precursor may include a core portion and a shell portion surrounding the core portion, and at least one of the core portion and the shell portion may have a metal concentration gradient.

The metal concentration gradient of the positive active material precursor may be variously changed in the method for manufacturing a positive active material according to some embodiments of the inventive concepts. In other words, embodiments of the inventive concepts are not limited to a specific composition and/or a specific metal concentration gradient of the positive active material precursor.

The positive active material precursor and lithium salt may be mixed with each other and may be fired to form a preliminary positive active material particle (S120). For example, the preliminary positive active material particle may include a compound of lithium, nickel and oxygen, a compound of lithium, nickel, manganese, cobalt and oxygen, or a compound of lithium, nickel, cobalt, aluminum and oxygen.

The preliminary positive active material particle may have surface residual lithium. For example, the surface residual lithium may be LiOH and/or $Li_2CO_3$. In an embodiment, the amount of LiOH may be less than the amount of $Li_2CO_3$.

A coating source including fluorine is prepared. According to an embodiment, the coating source may be provided in powder form. For example, the coating source may be $NH_4F$ or $NH_4HF_2$. Alternatively, for another example, the coating source may be polymer including fluorine, e.g., PVDF.

The preparation of the coating source including fluorine may include thermally treating the coating source and pulverizing the coating source. The coating source may be thermally treated to remove moisture in the coating source. Thus, it is possible to inhibit or prevent characteristics of a positive active material from being deteriorated by moisture in a process of dry-mixing the coating source with the preliminary positive active material particle, which will be described later. For example, the coating source may be thermally treated at a temperature of 100° C. to 200° C. for 24 hours. In addition, the coating source may be pulverized to have nanometer to micrometer sizes. Thus, a coating material may be substantially uniformly formed on a surface of the preliminary positive active material particle in the process of dry-mixing the coating source with the preliminary positive active material particle, which will be described later.

A coating material including fluorine may be formed on the preliminary positive active material particle by dry-mixing the coating source with the preliminary positive active material particle (S130). According to an embodiment, the coating source and the preliminary positive active material particle may be physically dry-mixed with each other. For example, the coating source and the preliminary positive active material particle may be physically dry-mixed with each other by a ball milling method or a hand mixing method.

According to an embodiment, in the process of forming the coating material by dry-mixing the coating source with the preliminary positive active material particle, a portion of the coating source may react with the surface residual lithium of the preliminary positive active material particle to form a compound (e.g., LiF) of lithium and fluorine. In this case, fluorine of the coating source may react mainly with LiOH of the surface residual lithium. Thus, the surface residual lithium of the preliminary positive active material particle may be reduced or decreased. In other words, the amount of the surface residual lithium of the preliminary positive active material particle dry-mixed with the coating source may be less than the amount of the surface residual lithium of the preliminary positive active material particle before the dry-mixing process.

In an embodiment, the coating source may be treated by a pre-thermal treatment at a temperature lower than a melting point of the coating source before dry-mixing the coating source with the preliminary positive active material particle. Thus, the coating material may be substantially uniformly formed on the preliminary positive active material particle. In addition, reactivity between fluorine of the coating material and the surface residual lithium of the preliminary positive active material particle may be improved to reduce the surface residual lithium, as described below. In an embodiment, the pre-thermal treatment of the coating source may be omitted.

The preliminary positive active material particle on which the coating material is formed may be thermally treated to form a positive active material particle (S140). Crystallinity of the positive active material particle may be improved by the thermal treatment.

According to an embodiment, a content of fluorine may become gradually less from a surface of the positive active material particle toward a central portion of the positive active material particle.

In addition, in the process of thermally treating the preliminary positive active material particle on which the coating material is formed, the coating material may react with the surface residual lithium of the preliminary positive active material particle to form a compound (e.g., LiF) of lithium and fluorine. In this case, fluorine of the coating material may react mainly with $Li_2CO_3$ of the surface residual lithium. Thus, after the thermal treatment process, the positive active material particle may include LiOH and $Li_2CO_3$ as the surface residual lithium, and the amount of $Li_2CO_3$ may be less than the amount of LiOH.

Even though the portion of the coating source reacts with the surface residual lithium in the process of dry-mixing the coating source with the preliminary positive active material particle as described above, the amount of the surface residual lithium reacting with the coating source may be small, and thus a large amount of the surface residual lithium may exist on the preliminary positive active material particle. In this case, the coating material may react with the large amount of the surface residual lithium by the thermal treatment to generate the compound of lithium and fluorine. Thus, the amount of the surface residual lithium of the positive active material particle may be less than the amount of the surface residual lithium of the preliminary positive active material particle dry-mixed with the coating source. As a result, according to the embodiments of the inventive concepts, the positive active material particle of which the surface residual lithium is reduced or decreased may be provided or realized.

In addition, as a content of the coating source (e.g., a content of fluorine) increases, the surface residual lithium of the positive active material particle may be reduced or decreased. According to an embodiment, a reduction ratio of $Li_2CO_3$ by the increase in the content of the coating source (e.g., the content of fluorine) may be greater than a reduction ratio of LiOH by the increase in the content of the coating source (e.g., the content of fluorine).

In an embodiment, the thermal treatment may be performed at a temperature of 300° C. or more.

According to an embodiment, the coating material and the positive active material particle may be thermally treated at a temperature higher than a melting point of $NH_4F$ or $NH_4HF_2$. Alternatively, according to another embodiment, the coating material and the positive active material particle may be thermally treated at a first temperature substantially equal to the melting point of $NH_4F$ or $NH_4HF_2$ and then may be thermally treated at a second temperature higher than the first temperature.

In addition, according to an embodiment, the thermal treatment may be performed at a temperature lower than a temperature at which a crystal structure of the positive active material particle is changed (hereinafter, referred to as 'a crystal structure changing temperature'). If the temperature of the thermal treatment is higher than the crystal structure changing temperature, fluorine included in the coating source may permeate into a crystal lattice of the positive active material particle, and thus the crystal structure of the positive active material particle may be changed. The temperature at which the crystal structure of the positive active material particle is changed may be changed depending on a content of nickel included in the positive active material particle. Thus, the thermal treatment may be performed at a temperature which is equal to or higher than 300° C. and lower than the crystal structure changing temperature determined depending on the content of nickel included in the positive active material particle. In detail, the crystal structure changing temperature may decrease as the content of nickel included in the positive active material particle increases. For example, when the content (or a concentration) of nickel of the positive active material particle is 80 mol % (e.g., $LiNi_{0.8}Co_xAl_y$, where $0<x<1$ and $0<y<1$), the crystal structure changing temperature may be 700° C. When the content (or the concentration) of nickel of the positive active material particle is 100 mol % (e.g., LiNiO), the crystal structure changing temperature may be 600° C.

If the content of fluorine is excessively high (i.e., if the coating material including fluorine is excessively provided on the surface of the positive active material particle), movement of lithium ions may be inhibited to deteriorate capacity characteristics of a secondary battery. Thus, according to an embodiment of the inventive concepts, the content of fluorine of the positive active material particle may be less than 5 mol %. In particular, the content of fluorine may be equal to or less than 2 mol %.

In an embodiment, the thermal treatment may be performed in an oxygen atmosphere. In more detail, the thermal treatment may be performed in an ultra-high purity oxygen atmosphere or in the atmosphere. Thus, deterioration of characteristics of the positive active material may be minimized.

According to the embodiments of the inventive concepts, the positive active material particle may include the compound of lithium and fluorine, and the compound of lithium and fluorine may minimize deterioration of characteristics by HF included in an electrolyte. Thus, life and capacity characteristics of a lithium secondary battery including the positive active material particle may be improved.

In addition, as described above, the coating source and the preliminary positive active material particle may be dry-mixed and thermally treated to form the positive active material particle. Thus, it is possible to provide the method for manufacturing the positive active material particle including fluorine, which is capable of simplifying manufacturing processes and of reducing a manufacture cost.

If the coating source and the preliminary positive active material particle are mixed and react with each other by a solution process unlike the aforementioned embodiments of the inventive concepts, lithium remaining on the surface of the preliminary positive active material particle may react with a solution to generate various byproducts (e.g., lithium carbonate), and characteristics of the positive active material may be deteriorated by the byproducts. In addition, the positive active material including nickel may be vulnerable to water, and thus characteristics of the positive active material may be further deteriorated when the fluorine coating process is performed using the solution process.

However, according to the aforementioned embodiments of the inventive concepts, the coating source and the preliminary positive active material particle may be dry-mixed and thermally treated, and thus it is possible to provide the positive active material which includes fluorine and has the improved life and capacity characteristics, and the method for manufacturing the same.

Detailed experimental examples of the method for manufacturing the positive active material according to the embodiments of the inventive concepts will be described hereinafter.

Manufacture of Positive Active Materials According to Embodiments 1 to 5

10 liters of distilled water was provided into a co-precipitation reactor (capacity: 47 L, output of rotating motor: 750 W or more). Thereafter, a $N_2$ gas was supplied into the reactor at a rate of 5 L/min, and the distilled water was stirred at 350 rpm while maintaining a temperature of the reactor at 45° C. A nickel sulfate aqueous solution with a concentration of 2M and an ammonia solution with a concentration of 10.5M were continuously supplied into the reactor for 15 to 35 hours at a rate of 0.561 L/hr and a rate of 0.128 L/hr, respectively. At the same time, a sodium hydroxide solution was additionally supplied to adjust a pH.

A produced $Ni(OH)_2$ metal composite hydroxide was filtered and cleaned by water and then was dried in a vacuum dryer at 110° C. for 12 hours. The metal composite hydroxide and lithium hydroxide (LiOH) were mixed with each other at a molar ratio of 1:1, and then, the mixture was heated at a heating rate of 2° C./min and then was maintained at 450° C. for 5 hours to perform a preliminary firing process. Thereafter, the mixture was fired at 650° C. for 10 hours to obtain a $LiNiO_2$ preliminary positive active material particle.

2 g of the $LiNiO_2$ preliminary positive active material particle and 1.0 mol % of $NH_4F$ used as the coating source were provided into a 20 ml PP cylindrical sample bottle and then were ball-milled using a zirconia ball at 100 rpm for 12 hours. Subsequently, the $LiNiO_2$ preliminary positive active material particle and the $NH_4F$ which were ball-milled were thermally treated at 400° C. for 5 hours to manufacture a positive active material including fluorine, according to an embodiment 1.

A positive active material including fluorine according to an embodiment 2 was manufactured using 2.0 mol % of $NH_4F$ by substantially the same processes as the embodiment 1 described above.

A positive active material including fluorine according to an embodiment 3 was manufactured using 2.0 mol % of $NH_4HF_2$ by substantially the same processes as the embodiment 1 described above.

A positive active material including fluorine according to an embodiment 4 was manufactured using 5.0 mol % of $NH_4F$ by substantially the same processes as the embodiment 1 described above.

A positive active material including fluorine according to an embodiment 5 was manufactured using 10.0 mol % of $NH_4F$ by substantially the same processes as the embodiment 1 described above.

Manufacture of Positive Active Material According to Comparative Example 1

For except the dry-mixing process with the coating source including fluorine and the thermal treatment process, other processes of the embodiment 1 described above were performed to manufacture a positive active material according to a comparative example 1.

The positive active materials according to the embodiments 1 to 5 and the comparative example 1 are listed in the following table 1.

TABLE 1

| Classification | Fluorine coating |
| --- | --- |
| Comparative example 1 | X |
| Embodiment 1 | $NH_4F$ 1.0 mol % |

TABLE 1-continued

| Classification | Fluorine coating |
| --- | --- |
| Embodiment 2 | $NH_4F$ 2.0 mol % |
| Embodiment 3 | $NH_4HF_2$ 2.0 mol % |
| Embodiment 4 | $NH_4F$ 5.0 mol % |
| Embodiment 5 | $NH_4F$ 10.0 mol % |

FIG. 2 is an X-ray diffraction (XRD) graph of positive active material particles according to a comparative example 1, an embodiment 2 and an embodiment 5.

Referring to FIG. 2, XRD data of the positive active material particles according to the comparative example 1, the embodiment 2 and the embodiment 5 were measured. As shown in the measured results of FIG. 2, the positive active materials coated with fluorine (i.e., the positive active materials of the embodiments 2 and 5 which have the coating materials including fluorine) have crystal structures which are substantially the same as a crystal structure of the positive active material not coated with fluorine. As a result, it may be recognized that the crystal structure is not changed by the fluorine coating.

FIG. 3 shows scanning electron microscope (SEM) images of the positive active material particle according to the comparative example 1. FIGS. 4 and 5 show SEM images and energy dispersive spectrometer (EDS) mapping data images of positive active materials obtained by applying coating sources of the embodiments 2 and 5 and ball mill processes (1 hour) to preliminary positive active material particles, respectively. FIGS. 6 and 7 show SEM images and EDS mapping data images of positive active materials obtained by applying the coating sources of the embodiments 2 and 5 and hand mixing processes (10 minutes) to preliminary positive active material particles, respectively.

Referring to FIGS. 4 and 5, the preliminary positive active material particle and the coating source of each of the embodiments 2 and 5 were ball-milled at 100 rpm for 1 hour to manufacture a positive active material, and SEM images and EDS mapping data images of the positive active materials were obtained. As shown in FIGS. 4 and 5, the coating material including fluorine is provided in the form of a layer substantially uniformly formed on a surface of a positive active material particle.

Referring to FIGS. 6 and 7, the preliminary positive active material particle and the coating source of each of the embodiments 2 and 5 were hand-mixed for 10 minutes to manufacture a positive active material, and SEM images and EDS mapping data images of the positive active materials were obtained. As shown in FIGS. 6 and 7, the coating material including fluorine is provided in a particle form on a surface of a positive active material particle.

As a result, it may be recognized that the coating material including fluorine may be formed in the layer form or the particle form by controlling or adjusting process conditions such as a mixing strength, a mixing time and a dry-mixing type of the coating source and the preliminary positive active material particle.

The amounts of surface residual lithium of the positive active materials according to the embodiments 1, 2, 4 and 5 and the comparative example 1 were measured, and the measured results are shown in the following table 2.

TABLE 2

| Classification | LiOH (ppm) | Li$_2$CO$_3$ (ppm) | total | Average | Reduction ratio |
|---|---|---|---|---|---|
| Comparative example 1 | 9311 | 12072 | 21384 | 21405.5 | — |
|  | 9021 | 12404 | 21426 |  |  |
| Embodiment 1 | 12972 | 7595 | 20568 | 20597.2 | −3.8% |
|  | 12843 | 7783 | 20626 |  |  |
| Embodiment 2 | 10442 | 4101 | 14544 | 14628.3 | −31.7% |
|  | 10200 | 4511 | 14712 |  |  |
| Embodiment 4 | 9171 | 2258 | 11429 | 11587.3 | −45.8% |
|  | 8731 | 3013 | 11744 |  |  |
| Embodiment 5 | 9490 | 0 | 9490 | 9419.9 | −56% |
|  | 9348 | 0 | 9348 |  |  |

As shown in the table 2, the amounts of the surface residual lithium of the positive active materials coated with fluorine according to the embodiments 1, 2, 4 and 5 are significantly less than the amount of the surface residual lithium of the positive active material not coated with fluorine according to the comparative example 1. In other words, it may be recognized that the coating material including fluorine reacts with the surface residual lithium to significantly reduce the surface residual lithium.

In addition, the amounts of the surface residual lithium of the positive active materials according to the embodiments 1, 2, 4 and 5 are less than that of the positive active material according to the comparative example 1 and at the same time, the amounts of Li$_2$CO$_3$ are less than the amounts of LiOH in the positive active materials according to the embodiments 1, 2, 4 and 5, unlike the positive active material according to the comparative example 1.

Furthermore, as seen from the embodiments 1, 2, 4 and 5, the amount of the surface residual lithium decreases as the content of fluorine increases, and a reduction amount of Li$_2$CO$_3$ is greater than a reduction amount of LiOH. In other words, it may be recognized that the coating material including fluorine effectively reacts with Li$_2$CO$_3$ to reduce the amount of Li$_2$CO$_3$.

However, movement of lithium ions may be inhibited when the content of the coating material including fluorine is excessively high, and thus the content of the coating material including fluorine may be controlled to minimize the surface residual lithium and to secure excellent discharge capacity and life characteristics.

FIG. 8 is a graph showing charge/discharge characteristics of secondary batteries including positive active materials according to embodiments 1 to 5 of the inventive concepts and the comparative example 1, and FIG. 9 is a graph showing life characteristics of the secondary batteries including the positive active materials according to the embodiments 1 to 5 of the inventive concepts and the comparative example 1.

Referring to FIGS. 8 and 9, half cells were manufactured using the positive active materials according to the embodiments 1 to 5 and the comparative example 1. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 8 and 9 and the following table 3. The number of the charge/discharge cycles is 100 in the following table 3.

TABLE 3

| Classification | 0.1 C, 1st Dis-capa (mAh/g) | 1st Efficiency | 0.2 C Capacity (mAh/g) | 0.2/ 0.1 C | 0.5 C Capacity (mAh/g) | 0.5 C/ 0.1 C | Cycle retention |
|---|---|---|---|---|---|---|---|
| Comparative example 1 | 247.7 | 96.7% | 244.7 | 98.8% | 237.0 | 95.7% | 78.0% |
| Embodiment 1 | 248.6 | 97.6% | 244.2 | 98.2% | 234.2 | 94.2% | 83.7% |
| Embodiment 2 | 246.8 | 97.7% | 240.9 | 97.6% | 228.3 | 92.5% | 85.1% |
| Embodiment 3 | 242.6 | 97.7% | 235.7 | 97.1% | 222.9 | 91.9% | 87.1% |
| Embodiment 4 | 239.6 | 96.2% | 231.6 | 96.7% | 215.5 | 89.9% | 84.8% |
| Embodiment 5 | 220.6 | 94.1% | 206.1 | 93.4% | 181.9 | 82.5% | 92.0% |

In FIGS. 8 and 9, LNO_Pristine, LNO_F_1 mol %, LNO_F_2 mol %, LNO_NH$_4$HF$_2$_2 mol %, LNO_F_5 mol %, and LNO_F_10 mol % mean the positive active materials according to the comparative example 1 and the embodiments 1, 2, 3, 4 and 5, respectively.

As shown in FIGS. 8 and 9 and the table 3, discharge capacity and life characteristics of the positive active materials coated with fluorine less than 5 mol % according to the embodiments 1 to 3 are significantly superior to those of the positive active material not coated with fluorine according to the comparative example 1.

Meanwhile, the coating materials including fluorine may be excessively provided on the surfaces of the positive active material particles coated with fluorine equal to or greater than 5 mol % according to the embodiments 4 and 5, and thus movement of lithium ions may be inhibited. As shown in FIGS. 8 and 9 and the table 3, life characteristics of the positive active materials according to the embodiments 4 and 5 are worse than those of the positive active material not coated with fluorine according to the comparative example 1.

As a result, the content of fluorine included in the positive active material may be controlled to be less than 5 mol %, and thus the capacity and life characteristics of the secondary battery may be effectively improved.

FIG. 10 is a graph showing life characteristics of the secondary batteries including the positive active materials according to the embodiments 2 and 5 of the inventive concepts and the comparative example 1.

Referring to FIG. 10, full cells were manufactured using graphite and the positive active materials according to the comparative example 1, the embodiment 2 and the embodiment 5, and discharge capacities according to the number of charge/discharge cycles of the full cells were measured under conditions of cut off 3.0V to 4.2V, 1.0 C, and 25° C. The measured results are shown in FIG. 10 and the following table 4.

TABLE 4

| Classification | 0.1 C, 1st Dis-Capa (mAh/g) | 1st Efficiency | 1.0 C Capacity (mAh/g) | 1.0 C/ 0.1 C | Cycle | 1.0 C Cycle Retention |
|---|---|---|---|---|---|---|
| Comparative example 1 | 214.4 | 95.1% | 207.3 | 96.7% | 1500 | 45.2% |
| Embodiment 2 | 209.5 | 99.5% | 199.3 | 95.8% | 512 | 82.0% |
| Embodiment 5 | 196.1 | 99.8% | 178.2 | 92.1% | 582 | 82.5% |

In FIG. 10, LNO_Pristine, LNO_F_2 mol %, and LNO_F_10 mol % mean the positive active materials according to the comparative example 1, the embodiment 2 and the embodiment 5, respectively.

As shown in FIG. 10 and the table 4, discharge capacity and life characteristics of the positive active material coated with 2 mol % of fluorine according to the embodiment 2 are significantly superior to those of the positive active material not coated with fluorine according to the comparative example 1.

Meanwhile, in the case of the positive active material coated with 10 mol % of fluorine according to the embodiment 5, life characteristics are improved but the capacity (i.e., the 1.0 C capacity value) is greatly reduced.

In other words, the content of fluorine included in the positive active material may be controlled to be less than 5 mol %, and thus life characteristics of the secondary battery may be effectively improved while minimizing reduction in capacity of the secondary battery.

Manufacture of Positive Active Materials According to Embodiments 6 to 10

10 liters of distilled water was provided into a co-precipitation reactor (capacity: 47 L, output of rotating motor: 750 W or more). Thereafter, a $N_2$ gas was supplied into the reactor at a rate of 5 L/min, and the distilled water was stirred at 350 rpm while maintaining a temperature of the reactor at 45° C. A first base aqueous solution of nickel sulfate and manganese sulfate (concentration: 2M, molar ratio of nickel:manganese=98:2) and an ammonia solution with a concentration of 10.5M were continuously provided into the reactor for 5 to 15 hours at rates of 0.561 L/hr and 0.128 L/hr, respectively, while mixing the first base aqueous solution with a second base aqueous solution of nickel sulfate, cobalt sulfate and manganese sulfate (concentration: 2M, molar ratio of nickel:cobalt:manganese=80:8:12) at a rate of 0.561 L/hr.

In addition, the first base aqueous solution and the ammonia solution with the concentration of 10.5M were continuously provided into the reactor for 10 to 20 hours at rates of 0.561 L/hr and 0.128 L/hr, respectively, while adding a third base aqueous solution of nickel sulfate, cobalt sulfate and manganese sulfate (concentration: 2M, molar ratio of nickel:cobalt:manganese=72:6:22) into the first base aqueous solution mixed with the second base aqueous solution at a rate of 0.561 L/hr. At the same time, a sodium hydroxide solution was additionally supplied to adjust a pH.

A produced $Ni_{0.80}Co_{0.05}Mn_{0.15}(OH)_2$ metal composite hydroxide was filtered and cleaned by water and then was dried in a vacuum dryer at 110° C. for 12 hours. The metal composite hydroxide and lithium hydroxide (LiOH) were mixed with each other at a molar ratio of 1:1, and then, the mixture was heated at a heating rate of 2° C./min and then was maintained at 450° C. for 5 hours to perform a preliminary firing process. Thereafter, the mixture was fired at 770° C. for 10 hours to obtain a $LiNi_{0.80}Co_{0.05}Mn_{0.15}O_2$ preliminary positive active material particle.

2 g of the $LiNi_{0.80}Co_{0.05}Mn_{0.15}O_2$ preliminary positive active material particle and 0.5 mol % of $NH_4F$ used as the coating source were provided into a 20 ml PP cylindrical sample bottle and then were ball-milled using a zirconia ball at 100 rpm for 12 hours. Subsequently, the $LiNi_{0.80}Co_{0.05}Mn_{0.15}O_2$ preliminary positive active material particle and the $NH_4F$ which were ball-milled were thermally treated at 400° C. for 5 hours to manufacture a positive active material including fluorine, according to an embodiment 6.

A positive active material including fluorine according to an embodiment 7 was manufactured using 1.0 mol % of $NH_4F$ by substantially the same processes as the embodiment 6 described above.

A positive active material including fluorine according to an embodiment 8 was manufactured using 2.0 mol % of $NH_4F$ by substantially the same processes as the embodiment 6 described above.

A positive active material including fluorine according to an embodiment 9 was manufactured using 4.0 mol % of $NH_4F$ by substantially the same processes as the embodiment 6 described above.

A positive active material including fluorine according to an embodiment 10 was manufactured using 10.0 mol % of $NH_4F$ by substantially the same processes as the embodiment 6 described above.

Manufacture of Positive Active Material According to Comparative Example 2

For except the dry-mixing process with the coating source including fluorine and the thermal treatment process, other processes of the embodiment 6 described above were performed to manufacture a positive active material according to a comparative example 2.

The positive active materials according to the embodiments 6 to 10 and the comparative example 2 are listed in the following table 5.

TABLE 5

| Classification | Fluorine coating |
|---|---|
| Comparative example 2 | X |
| Embodiment 6 | $NH_4F$ 0.5 mol % |
| Embodiment 7 | $NH_4F$ 1.0 mol % |
| Embodiment 8 | $NH_4F$ 2.0 mol % |
| Embodiment 9 | $NH_4F$ 4.0 mol % |
| Embodiment 10 | $NH_4F$ 10.0 mol % |

The amounts of surface residual lithium of the positive active materials according to the comparative example 2 and the embodiment 7 were measured, and the measured results are shown in the following table 6.

TABLE 6

| Classification | LiOH (ppm) | $Li_2CO_3$ (ppm) | Total | Reduction ratio |
|---|---|---|---|---|
| Comparative example 2 | 8837.5 | 2248.4 | 11085.9 | — |
| Embodiment 7 | 7635.8 | 1418.5 | 9054.3 | −18.3% |

FIG. 11 is a graph showing X-ray photoelectron spectroscopy (XPS) measurement data of positive active materials according to embodiments 8 to 10 of the inventive concepts, FIG. 12 is a graph for checking a reaction result of LiOH and $NH_4F$, and FIG. 13 is a graph for checking a reaction result of $Li_2CO_3$ and $NH_4F$.

Referring to FIG. 11, XPS data of the positive active materials according to the embodiments 8 to 10 were checked. As shown in FIG. 11, F 1s peaks are observed at about 685 eV corresponding to binding energy of LiF in the positive active materials according to the embodiments 8 to 10. In addition, a magnitude of the peak increases as the content of fluorine increases.

Referring to FIGS. 12 and 13, to check reaction results of LiOH and $NH_4F$, LiOH and $NH_4F$ were mixed with each other at a molar ratio of 1:1 and then were thermally treated at 400° C. for 5 hours. To check reaction results of $Li_2CO_3$ and $NH_4F$, $Li_2CO_3$ and $NH_4F$ were mixed with each other at a molar ratio of 1:1 and then were thermally treated at 400° C. for 5 hours. Thereafter, XRD data were measured as shown in FIGS. 12 and 13. As seen from FIGS. 12 and 13, a reaction product of LiOH and $NH_4F$ is LiF, and a reaction product of $Li_2CO_3$ and $NH_4F$ is also LiF.

As a result, as shown in FIGS. 11 to 13 and the table 6, fluorine included in the coating source reacts with the surface residual lithium of the preliminary positive active material particle to generate a compound of lithium and fluorine through the processes of dry-mixing and thermally treating the preliminary positive active material particle and the coating source including fluorine, and thus the surface residual lithium of the positive active material particle may be reduced.

FIG. 14 shows a transmission electron microscope (TEM) image and an EDS mapping data image of the positive active material according to the embodiment 10.

Referring to FIG. 14, a TEM image and an EDS mapping data image of the positive active material according to the embodiment 10 were obtained. As shown in FIG. 14, a surface of the positive active material particle is coated with fluorine.

FIG. 15 shows TEM images of the positive active material according to the embodiment 10.

Referring to FIG. 15, TEM images of the positive active material according to the embodiment 10 were obtained. In addition, atomic percentages (%) of the positive active materials according to the embodiments 8 to 10 were measured, and the measured results are shown in the following table 7. In the following table 7, spectra 1 to 3 are atomic percentages (%) measured at spots of spectra 1 to 3 of images (a), (b) and (c) of FIG. 15, respectively.

TABLE 7

| Classification | | F Atomic % | Ni Atomic % | Co Atomic % | Mn Atomic % |
|---|---|---|---|---|---|
| Embodiment 8 | | 3.86 | 13.54 | 1.02 | 4.37 |
| Embodiment 9 | | 4.26 | 17.06 | 1.38 | 5.98 |
| Embodiment 10 | Spectrum 1 | 36.93 | 4.72 | 0.26 | 0.81 |
| | Spectrum 2 | 21.28 | 12.67 | 0.99 | 4.37 |
| | Spectrum 3 | 12.47 | 14.82 | 1.23 | 4.81 |

As shown in FIG. 15 and the table 7, the content of fluorine is high at the surface of the positive active material particle, and the content of fluorine becomes gradually less toward a central portion of the positive active material particle.

FIG. 16 is a graph showing charge/discharge characteristics of secondary batteries including positive active materials according to embodiments 6 and 7 of the inventive concepts and a comparative example 2, and FIG. 17 is a graph showing life characteristics of the secondary batteries including the positive active materials according to the embodiments 6 and 7 of the inventive concepts and the comparative example 2.

Referring to FIGS. 16 and 17, half cells were manufactured using the positive active materials according to the embodiments 6 and 7 and the comparative example 2. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 16 and 17 and the following table 8. The number of the charge/discharge cycles is 100 in the following table 8.

TABLE 8

| Classification | 0.1 C, 1st Dis-capa (mAh/g) | 1st Efficiency | 0.2 C Capacity (mAh/g) | 0.2/ 0.1 C | 0.5 C Capacity (mAh/g) | 0.5 C/ 0.1 C | Cycle retention |
|---|---|---|---|---|---|---|---|
| Comparative example 2 | 214.2 | 96.7% | 209.3 | 97.7% | 201.1 | 93.9% | 94.0% |
| Embodiment 6 | 214.3 | 97.1% | 209.8 | 97.9% | 202.4 | 94.4% | 95.4% |
| Embodiment 7 | 215.2 | 96.3% | 210.6 | 97.9% | 202.4 | 94.1% | 96.2% |

In FIGS. 16 and 17, NCM 1_Pristine, NCM 1_F_0.5 mol %, and NCM 1_F_1 mol % mean the positive active materials according to the comparative example 2, the embodiment 6, and the embodiment 7, respectively.

As shown in FIGS. 16 and 17 and the table 8, discharge capacity and life characteristics of the positive active materials coated with fluorine according to the embodiments 6 and 7 are significantly superior to those of the positive active material not coated with fluorine according to the comparative example 2.

FIG. 18 is a graph showing charge/discharge characteristics of the secondary batteries including the positive active materials according to the embodiment 7 of the inventive concepts and the comparative example 2, and FIG. 19 is a graph showing life characteristics of the secondary batteries including the positive active materials according to the embodiment 7 of the inventive concepts and the comparative example 2.

Referring to FIGS. 18 and 19, full cells were manufactured using graphite and the positive active materials according to the comparative example 2 and the embodiment 7. Discharge capacities of the full cells were measured under conditions of cut off 3.0V to 4.2V, 0.1 C, and 25° C., and discharge capacities according to the number of charge/discharge cycles of the full cells were measured under conditions of cut off 3.0V to 4.2V, 0.8 C charge, 1.0 C discharge, and 25° C. The measured results are shown in FIGS. 18 and 19 and the following table 9.

TABLE 9

| Classification | 0.1 C, 1st Dis-Capa (mAh/g) | 1st Efficiency | 1.0 C Capacity (mAh/g) | 1.0 C/ 0.1 C | Cycle | 1.0 C Cycle Retention |
| --- | --- | --- | --- | --- | --- | --- |
| Comparative example 2 | 181.7 | 98.8% | 176.6 | 97.2% | 2000 | 79.5% |
| Embodiment 7 | 185.2 | 99.2% | 179.7 | 97.0% | 3053 | 89.1% |

In FIGS. 18 and 19, NCM 1_Pristine and NCM 1_F_1 mol % mean the positive active materials according to the comparative example 2 and the embodiment 7, respectively.

As shown in FIGS. 18 and 19 and the table 9, discharge capacity and life characteristics of the positive active material coated with fluorine according to the embodiment 7 are significantly superior to those of the positive active material not coated with fluorine according to the comparative example 2.

Manufacture of Positive Active Material According to Embodiment 11

10 liters of distilled water was provided into a co-precipitation reactor (capacity: 47 L, output of rotating motor: 750 W or more). Thereafter, a $N_2$ gas was supplied into the reactor at a rate of 5 L/min, and the distilled water was stirred at 350 rpm while maintaining a temperature of the reactor at 45° C. An aqueous solution of nickel sulfate, cobalt sulfate and manganese sulfate (concentration: 2M, molar ratio of nickel:cobalt:manganese=60:20:20) and an ammonia solution with a concentration of 10.5M were continuously provided into the reactor for 15 to 35 hours at a rate of 0.561 L/hr and a rate of 0.128 L/hr, respectively. At the same time, a sodium hydroxide solution was additionally supplied to adjust a pH.

A produced $Ni_{0.60}Co_{0.20}Mn_{0.20}(OH)_2$ metal composite hydroxide was filtered and cleaned by water and then was dried in a vacuum dryer at 110° C. for 12 hours. The metal composite hydroxide and lithium hydroxide (LiOH) were mixed with each other at a molar ratio of 1:1, and then, the mixture was heated at a heating rate of 2° C./min and then was maintained at 450° C. for 5 hours to perform a preliminary firing process. Thereafter, the mixture was fired at 840° C. for 10 hours to obtain a $LiNi_{0.60}Co_{0.20}Mn_{0.20}O_2$ preliminary positive active material particle.

2 g of the $LiNi_{0.60}Co_{0.20}Mn_{0.20}O_2$ preliminary positive active material particle and 1.0 mol % of $NH_4F$ used as the coating source were provided into a 20 ml PP cylindrical sample bottle and then were ball-milled using a zirconia ball at 100 rpm for 12 hours. Subsequently, the $LiNi_{0.60}Co_{0.20}Mn_{0.20}O_2$ preliminary positive active material particle and the $NH_4F$ which were ball-milled were thermally treated at 400° C. for 5 hours to manufacture a positive active material including fluorine, according to an embodiment 11.

Manufacture of Positive Active Material According to Comparative Example 3

For except the dry-mixing process with the coating source including fluorine and the thermal treatment process, other processes of the embodiment 11 described above were performed to manufacture a positive active material according to a comparative example 3.

FIG. 20 is a graph showing charge/discharge characteristics of secondary batteries including positive active materials according to an embodiment 11 of the inventive concepts and a comparative example 3, and FIG. 21 is a graph showing life characteristics of the secondary batteries including the positive active materials according to the embodiment 11 of the inventive concepts and the comparative example 3.

Referring to FIGS. 20 and 21, half cells were manufactured using the positive active materials according to the embodiment 11 and the comparative example 3. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 20 and 21 and the following table 10. The number of the charge/discharge cycles is 100 in the following table 10.

TABLE 10

| Classification | 0.1 C, 1st Dis-capa (mAh/g) | 1st Efficiency | 0.2 C Capacity (mAh/g) | 0.2/ 0.1 C | 0.5 C Capacity (mAh/g) | 0.5 C/ 0.1 C | Cycle retention |
| --- | --- | --- | --- | --- | --- | --- | --- |
| Comparative example 3 | 185.3 | 95.4% | 181.3 | 97.8% | 175.1 | 94.5% | 96.0% |
| Embodiment 11 | 185.8 | 95.7% | 182.1 | 98.0% | 175.8 | 94.6% | 97.6% |

In FIGS. 20 and 21, NCM 2_Pristine and NCM 2_F_1 mol % mean the positive active materials according to the comparative example 3 and the embodiment 11, respectively.

As shown in FIGS. 20 and 21 and the table 10, discharge capacity and life characteristics of the positive active material coated with fluorine according to the embodiment 11 are significantly superior to those of the positive active material not coated with fluorine according to the comparative example 3.

When the coating source including fluorine and the preliminary positive active material particle are dry-mixed and thermally treated according to the embodiments of the inventive concepts, the capacity and life characteristics of the positive active material particles having high nickel contents in the embodiments 6 to 10 may be improved, and the capacity and life characteristics of the positive active material particle having a low nickel content in the embodiment 11 may also be improved.

Manufacture of Positive Active Material According to Embodiment 12

10 liters of distilled water was provided into a co-precipitation reactor (capacity: 47 L, output of rotating motor: 750 W or more). Thereafter, a $N_2$ gas was supplied into the reactor at a rate of 5 L/min, and the distilled water was stirred at 350 rpm while maintaining a temperature of the reactor at 45° C. An aqueous solution of nickel sulfate and cobalt sulfate (concentration: 2M, molar ratio of nickel:cobalt=88.5:11.5) and an ammonia solution with a concentration of 10.5M were continuously provided into the reactor for 15 to 35 hours at a rate of 0.561 L/hr and a rate of 0.128 L/hr, respectively. At the same time, a sodium hydroxide solution was additionally supplied to adjust a pH.

A produced $Ni_{0.885}Co_{0.115}(OH)_2$ metal composite hydroxide was filtered and cleaned by water and then was dried in a vacuum dryer at 110° C. for 12 hours. The metal composite hydroxide was mixed with 3 mol % of aluminum hydroxide ($Al(OH)_3$) to add aluminum into the metal composite hydroxide. The metal composite hydroxide including the aluminum hydroxide was mixed with lithium hydroxide (LiOH) at a molar ratio of 1:1, and then, the mixture was heated at a heating rate of 2° C./min and then was maintained at 450° C. for 5 hours to perform a preliminary firing process. Thereafter, the mixture was fired at 700° C. for 10 hours to obtain a $LiNi_{0.86}Co_{0.1}Al_{0.03}O_2$ preliminary positive active material particle.

2 g of the $LiNi_{0.86}Co_{0.11}Al_{0.03}O_2$ preliminary positive active material particle and 1.0 mol % of $NH_4F$ used as the coating source were provided into a 20 ml PP cylindrical sample bottle and then were ball-milled using a zirconia ball at 100 rpm for 12 hours. Subsequently, the $LiNi_{0.86}Co_{0.11}Al_{0.03}O_2$ preliminary positive active material particle and the $NH_4F$ which were ball-milled were thermally treated at 400° C. for 5 hours to manufacture a positive active material including fluorine, according to an embodiment 12.

Manufacture of Positive Active Material According to Comparative Example 4

For except the dry-mixing process with the coating source including fluorine and the thermal treatment process, other processes of the embodiment 12 described above were performed to manufacture a positive active material according to a comparative example 4.

FIG. 22 is a graph showing charge/discharge characteristics of secondary batteries including positive active materials according to an embodiment 12 of the inventive concepts and a comparative example 4, and FIG. 23 is a graph showing life characteristics of the secondary batteries including the positive active materials according to the embodiment 12 of the inventive concepts and the comparative example 4.

Referring to FIGS. 22 and 23, half cells were manufactured using the positive active materials according to the embodiment 12 and the comparative example 4. Discharge capacities of the half cells were measured under conditions of cut off 2.7V to 4.3V, 0.1 C, and 30° C., and discharge capacities according to the number of charge/discharge cycles of the half cells were measured under conditions of cut off 2.7V to 4.3V, 0.5 C, and 30° C. The measured results are shown in FIGS. 22 and 23 and the following table 11. The number of the charge/discharge cycles is 100 in the following table 11.

TABLE 11

| Classification | 0.1 C, 1st Dis-capa (mAh/g) | 1st Efficiency | 0.2 C Capacity (mAh/g) | 0.2/ 0.1 C | 0.5 C Capacity (mAh/g) | 0.5 C/ 0.1 C | Cycle retention |
|---|---|---|---|---|---|---|---|
| Comparative example 4 | 217.4 | 95.5% | 212.8 | 97.9% | 203.9 | 93.8% | 93.2% |
| Embodiment 12 | 216.2 | 95.3% | 211.9 | 98.0% | 202.5 | 93.7% | 97.4% |

In FIGS. 22 and 23, NCA_Pristine and NCA_F_1 mol % mean the positive active materials according to the comparative example 4 and the embodiment 12, respectively.

As shown in FIGS. 22 and 23 and the table 11, discharge capacity and life characteristics of the positive active material coated with fluorine according to the embodiment 12 are significantly superior to those of the positive active material not coated with fluorine according to the comparative example 4.

In addition, the technical features of the inventive concepts which improves the capacity and life characteristics by dry-mixing and thermally treating the preliminary positive active material particle and the coating source including fluorine may be applied to the positive active material particle including nickel, cobalt and aluminum in the embodiment 12 as well as the positive active material particle including nickel, cobalt and manganese in the embodiments 6 to 11.

To check a change in characteristic of the positive active material according to a temperature of the thermal treatment performed after dry-mixing the preliminary positive active material particle and the coating source including fluorine, positive active materials according to embodiments 13 to 17 were manufactured using different thermal treatment temperatures shown in the following table 12 by substantially the same method as the embodiment 1, and a positive active material according to a comparative example 5 was manufactured.

TABLE 12

| Classification | Fluorine coating | Thermal treatment temperature |
|---|---|---|
| Comparative example 5 | X | X |
| Embodiment 13 | NH$_4$F 1.0 mol % | 100° C. |
| Embodiment 14 | NH$_4$F 1.0 mol % | 200° C. |
| Embodiment 15 | NH$_4$F 1.0 mol % | 300° C. |
| Embodiment 16 | NH$_4$F 1.0 mol % | 350° C. |
| Embodiment 17 | NH$_4$F 1.0 mol % | 400° C. |

FIG. 24 is a graph showing life characteristics of secondary batteries including positive active materials according to embodiments 13 to 17 and a comparative example 5.

Referring to FIG. 24, half cells were manufactured using the positive active materials according to the comparative example 5 and the embodiments 13 to 17, and discharge capacities according to the number of charge/discharge cycles of the half cells were measured under conditions of cut off 2.7V to 4.3V, 0.5 C, and 30° C. The measured results are shown in FIG. 24 and the following table 13. The number of the charge/discharge cycles is 40 in the following table 13.

TABLE 13

| Classification | 0.1 C, 1st Dis-capa (mAh/g) | 1st Efficiency | 0.2 C Capacity (mAh/g) | 0.2/ 0.1 C | 0.5 C Capacity (mAh/g) | 0.5 C/ 0.1 C | Cycle retention |
|---|---|---|---|---|---|---|---|
| Comparative example 5 | 210.2 | 95.8% | 204.5 | 97.3% | 195.5 | 93.0% | 97.7% |
| Embodiment 13 | 203.5 | 93.0% | 195.5 | 96.0% | 181.7 | 89.3% | 100.1% |
| Embodiment 14 | 204.4 | 94.1% | 196.4 | 96.1% | 183.9 | 90.0% | 100.1% |
| Embodiment 15 | 211.0 | 95.8% | 204.1 | 96.7% | 192.8 | 91.4% | 101.4% |
| Embodiment 16 | 211.8 | 96.1% | 205.0 | 96.7% | 194.1 | 91.6% | 101.4% |
| Embodiment 17 | 212.0 | 95.9% | 204.9 | 96.7% | 194.3 | 91.7% | 102.0% |

In FIG. 24, NCM 3_Pristine, NCM 3_F_1 mol % 100° C., NCM 3_F_1 mol % 200° C., NCM 3_F_1 mol % 300° C., NCM 3_F_1 mol % 350° C., and NCM 3_F_1 mol % 400° C. mean the positive active materials according to the comparative example 5 and the embodiments 13, 14, 15, 16 and 17, respectively.

As shown in FIG. 24 and the table 13, life and capacity characteristics of the positive active materials manufactured by performing the thermal treatments at 300° C. or more according to the embodiments 15 to 17 are significantly superior to those of the positive active materials manufactured by performing the thermal treatments at 100° C. and 200° C. according to the embodiments 13 and 14.

In addition, the life and capacity characteristics of the positive active materials manufactured by performing the thermal treatments at 100° C. and 200° C. are worse than those of the positive active material not coated with fluorine according to the comparative example 5.

As a result, according to the embodiments of the inventive concepts, the thermal treatment process may be performed at 300° C. or more after dry-mixing the preliminary positive active material particle and the coating source, and thus the capacity and life characteristics of the secondary battery may be effectively improved.

FIG. 25 is a graph for checking metal elution of the positive active material according to the embodiment 7 of the inventive concepts, and FIG. 26 is a graph for checking metal elution of the positive active material according to the comparative example 2.

Referring to FIGS. 25 and 26, to check a degree of metal elution of the positive active material including fluorine, each of electrodes respectively including the positive active material of the embodiment 7 and the positive active material of the comparative example 2 was charged with 4.3V and then was immersed in an electrolytic solution including LiPF$_6$, ethylene carbonate, and ethyl methyl carbonate, and the amounts of metals eluted into the electrolytic solution for a week were measured.

As shown in FIGS. 25 and 26, the elution amounts of nickel, cobalt and manganese of the positive active material having the coating material including fluorine according to the embodiment 7 are significantly less than those of the positive active material not including fluorine according to the comparative example 2. In particular, the elution amount of nickel of the positive active material according to the embodiment 7 is significantly less than that of the positive active material according to the comparative example 2.

In addition, HF generated in the electrolytic solution in which each of the positive active materials of the embodiment 7 and the comparative example 2 was immersed for 4 weeks was measured. The measured results are shown in the following table 14. In addition, an electrolytic solution in which the positive active materials of the embodiment 7 and the comparative example 2 were not immersed was kept at 55° C. for 4 weeks, and then, about 250.60 ppm of HF was generated therein.

TABLE 14

| Classification | First measurement (ppm) | Second measurement (ppm) |
|---|---|---|
| Comparative example 2 | 865.78 | 976.38 |
| Embodiment 7 | 264.56 | 280.31 |

As shown in the table 14, the amount of the generated HF of the positive active material including the fluorine coating material according to the embodiment 7 is significantly less than the amount of the generated HF of the positive active material not including fluorine according to the comparative example 2. In other words, the positive active material having the coating material including fluorine according to the embodiments of the inventive concepts may minimize deterioration of characteristics by HF.

The positive active material according to the embodiments of the inventive concepts may be used in lithium secondary batteries, and the lithium secondary battery including the positive active material according to the embodiments of the inventive concepts may be used in various industrial fields such as portable electronic devices, electric cars, and/or energy storage systems (ESS).

The method for manufacturing the positive active material according to the embodiments of the inventive concepts may include forming a positive active material precursor including nickel, mixing and firing the positive active material precursor and lithium salt to form a preliminary positive active material particle, forming a coating material including fluorine on the preliminary positive active material particle by dry-mixing the preliminary positive active material particle with a coating source including fluorine, and manufacturing a positive active material particle by thermally treating the preliminary positive active material particle on which the coating material is formed.

Thus, the life and capacity characteristics of the lithium secondary battery including the positive active material particle may be improved.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A positive active material including a positive active material particle containing lithium, a transition metal, fluorine (F), and oxygen,
    wherein the fluorine is provided on a surface of the positive active material particle and an inner portion of the positive active material particle,
    the fluorine provided on the surface of the positive active material particle includes a coating material containing LiF, and is provided in a form of a layer or a particle on the surface of the positive active material particle,
    a content of the fluorine provided in the inner portion of the positive active material particle gradually decreases in at least a part of the inner portion of the positive active material particle,
    the transition metal contains 60 mol % or more of nickel, and
    the fluorine (F) is provided to the positive active material particle by dry-mixing using a fluorine source containing $NH_4F$ or $NH_4HF_2$.

2. The positive active material of claim 1, wherein the positive active material particle contains lithium, a transition metal, fluorine (F), and oxygen, and
    the positive active material particle contains LiOH and $Li_2CO_3$ as surface residual lithium, and the amount of $Li_2CO_3$ is smaller than the amount of LiOH.

3. The positive active material of claim 1, wherein the transition metal further includes at least one of cobalt, manganese, and aluminum.

4. The positive active material of claim 1, wherein a concentration of the transition metal is constant in the inner portion of the positive active material particle.

5. The positive active material of claim 1, wherein the transition metal has a concentration gradient in the inner portion of the positive active material particle.

* * * * *